United States Patent
Knox et al.

(10) Patent No.: US 7,465,414 B2
(45) Date of Patent: Dec. 16, 2008

(54) PHOTOCHROMIC ARTICLE

(75) Inventors: Carol L. Knox, Monroeville, PA (US); William H. McDonald, West Mars, Butler County, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 168 days.

(21) Appl. No.: 10/294,058

(22) Filed: Nov. 14, 2002

(65) Prior Publication Data

US 2004/0096666 A1    May 20, 2004

(51) Int. Cl.
  *G08B 5/23* (2006.01)
  *G02F 1/01* (2006.01)
  *B32B 27/18* (2006.01)

(52) U.S. Cl. ............... 252/586; 359/238; 428/423.3; 428/424.4; 428/424.6; 428/412

(58) Field of Classification Search ........... 428/412, 428/423.1, 423.3, 424.4, 424.6; 252/586; 359/238
  See application file for complete search history.

(56) References Cited

U.S. PATENT DOCUMENTS

| | | | |
|---|---|---|---|
| 4,090,830 A | 5/1978 | Laliberte | 425/117 |
| 4,364,786 A | 12/1982 | Smith et al. | 156/99 |
| 4,495,015 A | 1/1985 | Petcen | 156/80 |
| 4,648,925 A | 3/1987 | Goepfert et al. | 156/153 |
| 4,679,918 A | 7/1987 | Ace | 351/163 |
| 4,756,973 A | 7/1988 | Sakagami et al. | 428/412 |
| 4,873,029 A | 10/1989 | Blum | 264/1.3 |
| 4,889,413 A | 12/1989 | Ormsby et al. | 350/354 |
| 4,923,758 A | 5/1990 | Marks et al. | 428/437 |
| 5,051,309 A | 9/1991 | Kawaki et al. | 428/332 |
| 5,126,208 A | 6/1992 | Larson | 428/425.5 |
| 5,149,181 A | 9/1992 | Bedford | 351/166 |
| 5,323,191 A | 6/1994 | Firtion et al. | 351/159 |
| 5,343,260 A | 8/1994 | Henry et al. | 351/159 |
| 5,405,557 A | 4/1995 | Kingsbury | 264/1.7 |
| 5,434,707 A | 7/1995 | Dalzell et al. | 359/485 |
| 5,496,641 A | 3/1996 | Mase et al. | 428/423.1 |
| 5,523,030 A | 6/1996 | Kingsbury | 264/1.7 |
| 5,658,501 A | 8/1997 | Kumar et al. | 252/586 |
| 5,702,813 A | 12/1997 | Murata et al. | 428/332 |
| 5,757,459 A | 5/1998 | Bhalakia et al. | 351/168 |
| 5,800,744 A | 9/1998 | Munakata | 264/1.7 |
| 5,827,614 A | 10/1998 | Bhalakia et al. | 428/411.1 |
| 5,830,578 A | 11/1998 | Ono et al. | 428/446 |
| 5,851,328 A | 12/1998 | Kohan | 156/102 |
| 5,856,860 A | 1/1999 | Bhalakia et al. | 351/168 |
| 5,858,163 A | 1/1999 | Wood et al. | 156/350 |
| 5,962,617 A | 10/1999 | Slagel | 528/61 |
| 5,998,520 A | 12/1999 | Krishnan et al. | 524/110 |
| 6,027,816 A * | 2/2000 | Ono et al. | 428/447 |
| 6,084,702 A * | 7/2000 | Byker et al. | 359/288 |
| 6,096,425 A | 8/2000 | Smith | 428/412 |
| 6,107,395 A | 8/2000 | Rosthauser et al. | 524/719 |
| 6,166,129 A | 12/2000 | Rosthauser et al. | 524/590 |
| 6,180,033 B1 | 1/2001 | Greshes | 264/1.32 |
| 6,187,444 B1 * | 2/2001 | Bowles, III et al. | 428/423.1 |
| 6,217,171 B1 | 4/2001 | Auten et al. | 351/160 H |
| 6,220,703 B1 | 4/2001 | Evans et al. | 351/163 |
| 6,256,152 B1 | 7/2001 | Coldrey et al. | 359/642 |
| 6,268,055 B1 * | 7/2001 | Walters et al. | 428/413 |
| 6,328,446 B1 | 12/2001 | Bhalakia et al. | 351/163 |
| 6,367,930 B1 * | 4/2002 | Santelices et al. | 351/177 |
| 7,189,456 B2 * | 3/2007 | King | 428/412 |

FOREIGN PATENT DOCUMENTS

| | | |
|---|---|---|
| EP | 0 146 136 A2 | 6/1985 |
| EP | 0 294 056 A2 | 5/1988 |
| JP | 64-30744 | 2/1989 |
| JP | 3-35236 | 2/1991 |
| JP | 3-269507 | 12/1991 |

OTHER PUBLICATIONS

Patent Abstract of Japan, Publication No. 03269507, Feb. 12, 1991 "Plastic Lens Having Dimming Property", Inventor: Yoshida Motoaki.

* cited by examiner

*Primary Examiner*—Thao T. Tran
(74) *Attorney, Agent, or Firm*—Linda Pingitore; Frank P. Mallak; Deborah M. Altman

(57) ABSTRACT

Describes an optical article, e.g., an ophthalmic photochromic article, such as a lens, in which the article includes: (1) a transparent substrate, such as a thermoset or thermoplastic plastic substrate, (2) a multiply laminate adjacent to at least one surface of the substrate, the laminate comprising (i) a transparent, thermoplastic polyurethane film, the thermoplastic, polyurethane film providing a desirable light filtering property, e.g., photochromism, and being juxtaposed to the surface of the substrate, the polyurethane being formed from a material comprising polyether-based polyurethane or polycarbonate-based polyurethane, and (ii) a transparent protective film of polymeric material, e.g., polycarbonate film, adjacent to the thermoplastic polyurethane film. Describes also the aforedescribed optical article having an abrasion-resistant coating affixed to the protective film, e.g., an organo-silane abrasion-resistant coating; and an optical article having an antireflective coating adhered to the abrasion-resistant coating.

37 Claims, No Drawings

PHOTOCHROMIC ARTICLE

DESCRIPTION OF THE INVENTION

The present invention relates to an article comprising a solid transparent substrate, e.g., a plastic substrate such as a polymeric material used for optical applications, and a thermoplastic polyurethane film appended to said substrate, which polyurethane film incorporates a desired light filtering property. In particular, the present invention relates to a photochromic optical article used for ophthalmic applications, e.g., a lens. More particularly, the present invention relates to an optical article comprising, in combination, (a) a solid transparent substrate having a front surface and a back surface, (b) transparent thermoplastic polyurethane film adjacent to at least one of said front and back surfaces, said polyurethane film providing a desirable light filtering property to said optical article, said polyurethane film further having been formed from a polyurethane composition comprising polyurethane material selected from polyether-based polyurethane material, polycarbonate-based polyurethane material and mixtures of such polyurethane materials, and (c) transparent protective film of polymeric material superposed on said transparent thermoplastic polyurethane film.

Still more particularly, the present invention relates to a photochromic optical article comprising (a) a solid transparent optical substrate having a front surface and a back surface, (b) transparent thermoplastic photochromic polyurethane film adjacent to at least one of said front and back surfaces of the substrate, the polyurethane film comprising a polyurethane material selected from polyether-based polyurethane and polycarbonate-based polyurethane, and a photochromic amount of at least one organic photochromic material, and (c) transparent protective film of polymeric material superposed on said transparent thermoplastic polyurethane film.

In a further embodiment of the present invention, there is contemplated an optical article comprising, in combination, (a) a solid transparent optical substrate having a front surface and a back surface, (b) a transparent laminate adjacent to at least one of said front and back surfaces of the optical substrate, the transparent laminate comprising (i) transparent thermoplastic photochromic polyurethane film, the polyurethane film being prepared from polyurethane material selected from polyether-based polyurethane and polycarbonate-based polyurethane, and containing a photochromic amount of at least one organic photochromic material, (ii) transparent polarizing film and (iii) transparent protective film of polymeric material superposed on one of said polarizing film or photochromic polyurethane film.

Still further, the present invention relates to an optical article comprising (a) a solid transparent optical substrate having a front surface and a back surface, (b) a transparent laminate adjacent to at least one of said front and back surfaces of the substrate, the transparent laminate comprising (i) a first transparent thermoplastic polyurethane film, (ii) a transparent polarizing film, (iii) a second transparent thermoplastic polyurethane film material selected from polyurethane material comprising polyether-based polyurethane and polycarbonate-based polyurethane, which second polyurethane film further provides a further desired light filtering property, e.g., photochromism and/or tinting, and (iv) transparent protective film of polymeric material superposed on said second transparent thermoplastic polyurethane film, said polarizing film being interposed between the first transparent polyurethane film and the second thermoplastic polyurethane film, said first transparent polyurethane film being adjacent to the surface of said optical substrate.

In a particular feature of the present invention, there is contemplated an optical article comprising, in combination, (a) a solid transparent optical substrate having a front surface and a back surface; (b) transparent, e.g., optically clear, thermoplastic polyurethane film adjacent to at least one surface of the substrate; (c) polarizing sheet or film appended to the surface of the polyurethane film of (b); (d) transparent, thermoplastic photochromic polyurethane film appended to said polarizing sheet/film, said photochromic polyurethane film containing a photochromic amount of at least one organic photochromic material and being formed from polyurethane material selected from polyether-based polyurethane, polycarbonate-based polyurethane and mixtures of said polyurethane materials; and (d) transparent protective film of polymeric material superposed on said photochromic polyurethane film. If the polarizing sheet/film does not absorb ultraviolet radiation, the order of placement of the photochromic polyurethane film and the polarizing sheet/film can be reversed.

In a further contemplated embodiment of the present invention, there is contemplated a high refractive index optical article comprising, in combination: (a) a transparent, solid optical material substrate having a front surface and a rear surface, said substrate having a refractive index of greater than 1.58, e.g., between 1.58 or 1.6 and 1.9; (b) transparent, thermoplastic photochromic polyurethane film appended to at least a portion of the surface of said high refractive index substrate, said polyurethane film being formed from polyurethane material selected from polyether-based polyurethane and polycarbonate-based polyurethane, and containing a photochromic amount of at least one organic photochromic material; and (c) transparent protective film of polymeric material superposed on said photochromic polyurethane film.

A further contemplated feature of each of the aforedescribed embodiments and features includes superposing an abrasion-resistant coating on the protective polymeric film. In a still further contemplated feature of the present invention, at least one antireflective layer or coating is superposed on the abrasion-resistant coating. Typically, the abrasion-resistant coating is a coating comprising an organo-silane. Additional layers or coatings may be juxtaposed to the abrasion-resistant coating and/or antireflective layer to provide additional functional or protective properties to the optical article.

In recent years, optical articles, particularly optical articles for ophthalmic applications that provide a light filtering function, have been the subject of considerable interest and research. Light filtering functions, such as photochromism, polarization and tinting, have been of particular interest. Clear plastic ophthalmic lenses that provide good imaging qualities while reducing the transmission of incident light into the eye are needed for a variety of applications, including use in sunglasses, fashion lenses, non-prescription (plano) and prescription lenses (finished and semi-finished), sport masks, face shields and goggles. In particular, photochromic ophthalmic plastic lenses have been of interest because of the weight advantage they offer vis-à-vis mineral glass lenses.

Photochromism is a phenomenon involving a reversible change in color of an organic or inorganic photochromic material, e.g., a chromene or silver halide salt respectively, or an article comprising such a photochromic material, when the photochromic material (or article) is exposed to ultraviolet radiation. Sources that contain ultraviolet radiation include, for example, sunlight and the light of a mercury lamp. When a photochromic material is exposed to ultraviolet radiation, it changes color, and when the ultraviolet radiation is discontinued, the photochromic material returns to its original color or colorless state. Articles that have photochromic material(s)

applied to, incorporated in, or otherwise associated with it exhibit this reversible change in color and a consequent reversible change in light transmission.

Polarized optical articles, such as polarized goggles and sun glasses for sport use, which reduce the glare of reflected light, have also become of increasing interest for outdoor activities. These articles include a glare-reducing material, e.g., a linear molecularly oriented dichroic dye, e.g., iodine, in a synthetic resin material, e.g., stretched (oriented) polyvinyl alcohol. Other means of filtering light through an optical article include tinting the article, e.g., incorporating a coloring dye into the matrix of the optical article or otherwise associating a dye with the article so that the incident light passes through the dye before reaching the eye.

The mechanism believed to be responsible for the reversible change in color of organic photochromic materials, i.e., the change in the absorption spectrum in the electromagnetic spectrum of visible light (400-700 nm) that is characteristic of different types of organic photochromic compounds, has been described. See, for example, John C. Crano, "Chromogenic Materials (Photochromic)", Kirk-Othmer Encyclopedia of Chemical Technology, Fourth Edition, 1993, pp. 321-332. The mechanism responsible for the reversible change in color for organic photochromic compounds, such as indolino spiropyrans, indolino spirooxazines, naphthopyrans, particularly indeno-fused naphthopyrans, is believed to involve an electrocyclic mechanism. When exposed to activating ultraviolet radiation, these organic photochromic compounds transform from a colorless closed ring compound into a colored open ring species. In contrast, the electrocyclic mechanism responsible for the reversible change in color of organic photochromic fulgide compounds is believed to be a transformation from a colorless open ring form into a colored closed ring form.

Photochromic plastic articles have been prepared by incorporating the photochromic material into the plastic substrate by surface imbibition techniques. See, for example, U.S. Pat. Nos. 5,130,353 and 5,185,390, which describe the inclusion of photochromic dyes into the subsurface region of a plastic article, such as a lens, by first applying one or more photochromic dyes/compounds to the surface of the article, either as the neat photochromic dye/compound or dissolved in a polymeric or other organic solvent carrier, and then using heat to cause the photochromic dye(s)/compounds to diffuse into the lens (a process commonly referred to as "imbibition"). The plastic substrates of such photochromic plastic articles are believed to have sufficient free volume and/or flexibility in the polymer matrix to allow photochromic compounds, such as the aforementioned spirooxazines, spiropyrans, naphthopyrans and fulgides, to convert from the. colorless form of the compounds into the colored form.

There are, however, certain polymer matrices that are believed not to have sufficient free volume or flexibility to allow the aforedescribed electrocyclic mechanism to occur sufficiently to permit commercial use of such polymer matrices as a substrate for imbibed (or internally incorporated) photochromic materials. When used in that manner, those polymer matrices do not produce commercially acceptable photochromic articles. Typically, the article does not darken sufficiently to be a commercially viable product, i.e., there is only a small change in optical density ($\Delta$ OD). Such polymer matrices include, for example, thermoset polymer matrices prepared from diallyl glycol bis(allyl carbonate) monomers, such as diethylene glycol bis(allyl carbonate) and copolymers thereof, and the commonly known thermoplastic bisphenol A-based polycarbonates. Mineral glass, which is an inorganic matrix, also is not considered by those skilled in the art to be useful as a substrate for internally incorporated organic photochromic materials.

It has been proposed to apply organic photochromic coatings to the surface(s) of substrates such as mineral glass, thermoset polymers, thermoplastic polycarbonates and highly cross-linked materials so that these materials may be used as substrates for organic photochromic articles. See, for example, U.S. Pat. No. 6,187,444 B1, which describes the application of a photochromic polyurethane coating to plastic and glass substrates. It has also been proposed to apply an abrasion-resistant coating onto the exposed surface of the photochromic coating to protect the surface of the photochromic coating from scratches and other similar defects resulting from physical handling, cleaning, and exposure of the photochromic coating to the environment. See, for example, U.S. Pat. No. 6,268,055 B1. The photochromic polyurethane coatings disclosed in U.S. Pat. No. 6,187,444 B1 are described as having a Fischer microhardness of from 50 to 150 Newtons per square millimeter, most preferably from 100 to 130 Newtons per square millimeter, in order to demonstrate good photochromic properties and provide a coating that meets optical coating cosmetic standards required by the optical industry. (Cosmetic standards include the absence of defects such as spots, scratches, inclusions, cracks and crazing in the coated lens.)

It has now been observed that the harder the photochromic coating, the slower are the rate at which the coating darkens and the rate at which the coating fades, i.e., bleaches back to its original or clear state. It would therefore be desirable to provide a photochromic article comprising a substrate that does not accommodate internally incorporated organic photochromic materials, which article not only exhibits relatively fast rates of darkening and fading, but which also is characterized by a large change in optical density ($\Delta$ OD) from the bleached state to the darkened state.

It has now been discovered that an improved article, which provides at least one light filtering property selected from photochromism, polarization and/or tinting, can be prepared. In one embodiment of such discovery, an article that provides a light filtering property selected from photochromism and/or tinting is prepared by placing an appropriate (as later described) thermoplastic polyurethane film (which comprises organic photochromic material and/or a tint or colored dye) adjacent to the surface of a pre-formed substrate, e.g., attaching directly the polyurethane film to the substrate (with or without a transparent adhesive), and superposing a protective polymeric film or layer on the thermoplastic polyurethane film. The presence of the protective polymeric film substantially eliminates the hardness requirement specified for the polyurethane coating described in the aforementioned '444 patent. The polyurethane film and protective film can be first laminated together and the resultant laminate placed on the surface of the pre-formed substrate. In another method, a preformed laminate of the polyurethane film and protective polymeric film is placed in a suitable mold, e.g., an optical mold (the protective polymeric film being next to the mold surface), and the substrate formed in-situ against the performed laminate by casting, injection molding, reaction injection molding, etc. In a further feature, an abrasion-resistant coating is superposed on the protective polymeric film, and in a still further feature, an antireflective coating can be superposed on the abrasion-resistant coating.

In another embodiment, a polarizing sheet or film is interposed between the polyurethane film and the protective polymeric film. In such an embodiment, the polarizing film should not absorb ultraviolet radiation in amounts that interfere with the light filtering mechanism associated with the polyurethane film, e.g., photochromism. In a further contemplated embodiment, a thermoplastic polyurethane film, that may or may not possess a light filtering property, is placed adjacent to the substrate followed sequentially by a polarizing film/sheet, a thermoplastic photochromic polyurethane film and then the protective polymeric film.

It has now also been discovered surprisingly that interference fringes caused by the mismatch of a high refractive index substrate and a lower refractive index coating that has been placed on such a substrate can be substantially eliminated by use of the thermoplastic polyurethane film of the present invention in place of the low refractive index coating, even though the refractive index of the thermoplastic polyurethane film is lower than the refractive index of the substrate. It has also been discovered that a laminate of the thermoplastic polyurethane film and protective polymeric film can be used in place of the polyurethane film and still avoid interference fringes. This discovery allows the facile preparation of photochromic articles that are substantially free of interference fringes with high refractive index substrates. Typically, high refractive index substrates, e.g., optical substrates, have a refractive index of at least 1.58, e.g., from 1.58 or 1.60 to 1.75 or 1.9. Coatings having a refractive index of less than 1.54 applied to such a high refractive index substrate result in the aforedescribed interference fringes.

In accordance with the present invention, there is provided an article, e.g., an optical article, comprising, in combination:

(a) a transparent solid substrate having a front surface and a back surface;

(b) transparent thermoplastic polyurethane film adjacent to at least one surface of said solid substrate, the polyurethane film providing at least one desirable light filtering property to said substrate and being formed from polyurethane material selected from polyether-based polyurethane, polycarbonate-based polyurethane and mixtures of such polyurethane materials, and (c) transparent protective polymeric film superposed on said polyurethane film.

In accordance also with the present invention, there is contemplated the above-described article further comprising an abrasion-resistant coating, such as a hard coating comprising an organo-silane, superposed on the surface of the protective polymeric film. In a still further embodiment of the present invention, there is contemplated an article that has an antireflective coating superposed on the abrasion-resistant coating. Other coatings, such as antistatic and/or anti-wetting coatings can also be applied to the antireflective coating. In addition, the light filtering property provided by a tinting dye can be associated with the optical article by adding such a dye to, for example, the polyurethane film or by providing a separate resin layer (coating, film or sheet) containing the tinting dye within the stack of functional films comprising the article.

In accordance with an embodiment of the present invention, there is contemplated a photochromic optical article, e.g., an ophthalmic photochromic article, such as a lens, comprising, in combination:

(a) a transparent solid optical substrate having a front surface and a back surface, (b) transparent photochromic thermoplastic polyurethane film adjacent to at least one surface of said optical substrate, said polyurethane film having been formed from polyurethane material selected from polyether-based polyurethane, polycarbonate-based polyurethane and mixtures of such polyurethane materials, and wherein said polyurethane film contains at least one organic photochromic material, and (c) transparent protective film of polymeric material superposed on said thermoplastic polyurethane film.

It is further contemplated that the foregoing photochromic optical article may provide a polarizing function in addition to the photochromic function, e.g., by combining a polarizing layer, e.g., a sheet or film, with the polyurethane film. In a typical embodiment, the polarizing layer is positioned between the polyurethane film and the protective polymeric material if the polarizing layer is not a significant ultraviolet light (UV) absorber. If the polarizing layer is a significant UV absorber, it is contemplated that the polarizing layer is positioned between the surface of the substrate and the photochromic polyurethane film.

In a further embodiment of the present invention, there is contemplated a photochromic optical article, such as an ophthalmic article, comprising, in combination:

(a) a transparent solid optical substrate having a front surface and a back surface;

(b) transparent, e.g., optically clear, thermoplastic polyurethane film adjacent to at least one surface of said optical substrate;

(c) polarizing layer adjacent to said transparent polyurethane film (b);

(d) transparent thermoplastic photochromic polyurethane film adjacent to the polarizing layer, said thermoplastic polyurethane film having been formed from polyurethane material selected from polyether-based polyurethane, polycarbonate-based polyurethane and mixtures of said polyurethane materials, said photochromic polyurethane film further containing at least one organic photochromic material; and (e) transparent protective film of polymeric material superposed on said photochromic polyurethane film. Abrasion-resistant coatings and antireflective coatings may be superposed on the protective film, as described previously.

In a still further embodiment of the present invention, there is contemplated a high refractive index optical article, e.g., an ophthalmic lens, comprising, in combination:

(a) a transparent solid optical substrate having a refractive index of at least 1.58, e.g., from 1.58 or 1.6 to 1.9, usually from 1.60 to 1.75;

(b) transparent thermoplastic polyurethane film adjacent to at least one surface of the said optical substrate, said polyurethane film providing at least one desired light filtering property to said substrate and being prepared from polyurethane material selected from polyether-based polyurethane, polycarbonate-based polyurethane materials and mixtures of such polyurethane materials; and (c) transparent protective film of polymeric material superposed on said thermoplastic polyurethane film. As with other embodiments, an abrasion-resistant coating may be superposed on said protective polymeric film, and antireflective coatings may be superposed on said abrasion-resistant coating.

In a particular embodiment of the present invention, there is contemplated a photochromic optical article comprising, in combination:

(a) a transparent solid organic plastic substrate, such as a thermoset substrate prepared from a polymerizable composition comprising an allyl glycol carbonate, e.g., diethylene glycol bis(allyl carbonate), a substrate prepared from thermoplastic polycarbonate, substrates prepared from polyurea urethanes, and substrates prepared from compositions comprising the reaction product of polyfunctional isocyanate(s) and polythiol or polyepisulfide monomers(s), the plastic substrate having a front surface and a back surface;

(b) transparent thermoplastic photochromic polyurethane film appended to at least one surface of said optical substrate, said polyurethane film containing a photochromic amount of at least one organic photochromic material and being prepared from polyurethane material selected from polyether-based polyurethane, polycarbonate-based polyurethane and mixtures of such polyurethane materials; and (c) transparent protective film of polymeric material superposed on said polyurethane film.

In another particular embodiment of the present invention, there is contemplated a photochromic optical article comprising, in combination:

(a) a transparent solid high refractive index substrate, such as an organic plastic substrate or a glass substrate, said substrate having a refractive index of, for example, from 1.58 to 1.9;

(b) transparent thermoplastic polyurethane film appended to at least one surface of said substrate, the polyurethane film containing at least one organic photochromic material; and (c) transparent protective film of polymeric material appended to said polyurethane film.

The articles of the present invention can be prepared by several methods. One contemplated method comprises the steps of:

(a) providing a preformed transparent solid optical substrate having a front surface and a back surface, (b) providing a preformed laminate comprising a ply of transparent thermoplastic polyurethane film and a ply of a transparent protective polymeric film, the polyurethane film providing at least one desired light filtering property and being formed from polyurethane material selected from polyether-based polyurethane, polycarbonate-based polyurethane and mixtures of such polyurethane materials, the laminate being of a size sufficient to cover the selected surface(s) of the substrate and which conforms to or is conformable to the shape of said selected surface(s), (c) placing the laminate adjacent to the selected surface(s) of the substrate, e.g., placing the polyurethane ply of the laminate in contact with the selected surface(s) of the substrate, and (d) press forming the laminate against the substrate under conditions of heat and pressure to adhere the laminate to the substrate.

The foregoing method can be modified to prepare articles having a polarizing function. In the modified method, a polarizing film/sheet is positioned between the polyurethane film and the protective film. In a case where the light filtering property is photochromism and the polarizing film/sheet absorbs a significant amount of UV radiation, the polarizing film/sheet is placed in front of the polyurethane film, i.e., adjacent to the surface of the preformed solid substrate. In a further modification of the foregoing method, the preformed laminate can comprise a stack comprising a ply of transparent thermoplastic polyurethane film (with or without photochromic or tint materials), polarizing sheet or film, thermoplastic transparent photochromic film and protective polymeric film.

Another contemplated method for preparing articles of the present invention comprises the steps of:

(a) providing a preformed laminate comprising, for example, a ply of transparent thermoplastic polyurethane film and a ply of transparent protective polymeric film, the polyurethane film providing at least one light filtering property, and being formed from polyurethane material selected from polyether-based polyurethane, polycarbonate-based polyurethane and mixtures of such polyurethane materials, the laminate being of a size sufficient to cover the selected surface of the optical article formed in step (e), (b) providing a mold designed for preparing articles of a desired size and shape, the mold having a first element, a second element and a cavity between such elements, (c) placing the laminate within the mold and against at least one of the mold surfaces of the first element or the second element that face the cavity, the protective polymeric film being adjacent to the surface of the first or second element, (d) injecting polymerizable resin capable of a forming a solid transparent plastic article into the cavity of the mold, and (e) curing the polymerizable resin, thereby to form a composite transparent plastic article comprising a transparent plastic substrate, which has the laminate attached to at least one surface of the substrate.

The foregoing methods are particularly useful for preparing optical articles, e.g., lenses by the use of optical molds, preformed optical substrates, polymerizable optical resins, etc. Certain polymerizable resins, e.g., polyurea urethanes, form quickly the desired substrate due to the speed at which the polymerization reaction occurs. In some instances, the curing step (e) in the above-described second contemplated method can involve a thermal post reaction step to allow the molded substrate to cure fully, i.e., a thermal post cure. The thermal post cure typically involves placing the molded plastic substrate (with or without the mold) in an oven maintained at a desired temperature for a short time. As in a previously described method, the laminate placed in the mold may contain also a polarizing film/sheet between the polyurethane film and the protective film in the manner discussed, and the laminate may be a modified laminate, as in a previously described method.

In the case of optical substrates having a high base curve, e.g., a base curve of greater than 4, the preformed laminate is shaped to the curvature of the optical substrate (or the shape of the concave surface of the optical mold when the optical substrate is formed in-situ) using heat and possible some positive pressure to conform the laminate to the surface of the substrate (or mold) before final preparation of the optical article.

DETAILED DESCRIPTION OF THE INVENTION

Substrates useful in preparing the articles of the present invention include transparent mineral glass, e.g., mineral glass useful for optical applications, and transparent plastic substrates, i.e., polymeric organic substrates that are transparent, e.g., optically clear. The substrate is solid and has a first surface and second surface, usually denoted as a front surface and a back surface. In certain embodiments of the methods used to prepare the articles of the present invention, the substrate is preformed. In other embodiments of such methods, the substrate is formed in-situ during preparation of the articles of the present invention, i.e., the substrate is prepared by casting, injection molding, reaction injection molding or other equivalent processes, in the presence of a laminate comprising the thermoplastic polyurethane film and the protective polymeric protective film. When the substrate is an ophthalmic article, e.g., a lens, the article will typically have a convex surface and a concave surface (either preformed or formed in-situ by the respective concave and convex surfaces of the optical mold in which the substrate is formed). The substrate provides the principal optical power and/or magnification characteristics of the optical article. The substrate of the present invention may be machined (ground) to modify the focal power of the article, e.g., a lens, to a desired prescription.

It is contemplated that the articles of the present invention can be used for a variety of applications. In particular, it is contemplated that such articles will be used in optical applications. As used in this description and accompanying claims, the terms "optical", "optical applications", "optical article" or terms of like import are meant to include those applications relating to or concerned with an individual's vision, e.g., an individual's ability to view objects. Non-limiting examples of optical applications include ophthalmic applications, such as plano (without optical power) and vision correcting (prescription) lenses (finished and semi-finished) including multifocal lenses (bifocal, trifocal, and progressive lenses), sun lenses, fashion lenses, sport masks, face shields and goggles; commercial and residential windows; architectural glazing, automotive and aircraft transparencies such as windshields, windshield visors and sun roofs; helmets, plastic sheeting, clear films, automatic teller machine screens, etc. By the term "transparent" or optically clear, as used in this disclosure and claims in connection with a substrate for an article, sheet, film or coating, is meant that the indicated substrate, sheet, film or coating has a light transmission of at least 70%, preferably at least 80%, and more preferably at least 85%.

Other than in the operating examples, or where otherwise indicated, all values, such as those expressing wavelengths, quantities of materials, recited ranges, percentages, reaction conditions, etc. used in this description and the accompanying claims are to be understood as modified in all instances by the term "about". When a series of recited ranges are used, the range can be between any combination of the specific values stated for the range, inclusive of the recited values.

Polymeric organic substrates that may be used in preparing optical articles of the present invention are any known (or later discovered) transparent plastic materials that are useful as substrates for optical applications, such as ophthalmic applications, e.g., lenses. Such plastic materials are prepared from art-recognized organic optical resins, which are used, for example, to prepare castings of optical quality, e.g., transparent, particularly, optically clear, castings.

Any conventional transparent mineral glass used for optical applications, i.e., glass of optical quality, can be used as a substrate to prepare the optical articles of the present invention. The glass substrate can be made of colorless or tinted mineral glass provided that the mineral glass meets the herein described transparency requirement. Such glass elements are available commercially, e.g., from Corning Incorporated, Corning N.Y. under the designation 0211. Glass used for automotive, and residential and commercial window applications is commercially available from any number of manufacturers.

Non-limiting examples of organic substrates that may be used to prepare optical articles of the present invention are the polymers, i.e., homopolymers and copolymers, of the monomers and mixtures of monomers disclosed in U.S. Pat. No. 5,962,617, and in column 15, line 28 to column 16, line 17 of U.S. Pat. No. 5,658,501, the disclosures of which polymers are incorporated herein by reference. Such organic substrates can be thermoplastic or thermoset polymeric substrates that have a refractive index that typically ranges from 1.48 to 1.90, e.g., from 1.48 to 1.75, more typically, from 1.50 to 1.67.

High refractive index substrates, i.e., substrates having a refractive index of at least 1.58, e.g., from 1.58 or 1.6 to 1.9, usually from 1.60 to 1.75, can be used in the present invention without concern for producing optical articles that exhibit interference fringes caused by the meaningful difference in refractive indices of the high index substrate and a lower index layer, e.g., the thermoplastic polyurethane film of the present invention, which is superposed, e.g., superimposed, on the optical surface of the high refractive index optical substrate. Such high refractive index substrates may be prepared from mineral glass or organic polymeric materials. In accordance with the present invention, an optical article that is substantially free of interference fringes is contemplated. This optical article comprises, in combination, a high refractive index optical substrate (as described herein) and either (a) the thermoplastic polyurethane film, (b) a laminate of the thermoplastic polyurethane film and protective polymeric film, or (c) a laminate of the thermoplastic polyurethane film, polarizing film, and protective polymeric film (all of the present invention) that is superposed on the optical surface of the optical article, e.g., placed directly upon the high index substrate.

Examples of the monomers and polymers referred to in the aforementioned U.S. Pat. Nos. 5,962,617 and 5,658,501 include, but are not limited to, polyol(allyl carbonate) monomers, e.g., diethylene glycol bis(allyl carbonate), which monomer is sold under the trademark CR-39 by PPG Industries, Inc; polyurea-polyurethane (polyurea urethane) polymers, which are the reaction product of a polyurethane prepolymer and a diamine curing agent, a composition for one such polymer being sold under the trademark TRIVEX by PPG Industries, Inc; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); acrylonitrile-styrene copolymers; cellulose acetate; epoxy resins; polyethylene; polypropylene; polyurethanes; polythiourethanes; thermoplastic polycarbonates, such as the carbonate-linked resin derived from bisphenol A and phosgene, such as the material sold under the trademark LEXAN; polyesters, such as the material sold under the trademark MYLAR; poly(ethylene terephthalate); polyvinyl butyral; poly(methyl methacrylate) and its copolymers, such as the material sold under the trademark PLEXIGLAS, and polymers prepared by reacting polyfunctional isocyanates with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also contemplated are art-recognized copolymers of such monomers, and blends of the described polymers and copolymers with other polymers, e.g., to form interpenetrating network products. The exact chemical makeup of the organic substrate is not critical to the present invention.

Of particular interest as a substrate are those optical resin materials prepared from compositions comprising polyol(allyl carbonate) monomers, polyurea urethanes and thermoplastic polycarbonates. These materials are known in the art for the production of transparent substrates useful for the preparation of articles of optical quality, e.g., ophthalmic articles such as lenses. Polyol(allyl carbonate) monomers, such as diethylene glycol bis(allyl carbonate), and compositions comprising such monomers are commercially available from PPG Industries, Inc. Non-limiting examples of such compositions include resin compositions sold under the designations CR-39® CR-307, CR-407 and CR-607 by PPG Industries, Inc.

Transparent thermoplastic polycarbonates useful for optical articles, such as lenses and glazing applications, and resins for preparing such transparent thermoplastic polycarbonates are known in the art. Examples of such polycarbonates are homopolycarbonates, copolycarbonates, branched polycarbonates, and mixtures thereof. Also included are blends of polycarbonates and polyesters, e.g., polycaprolactone, such as described in U.S. Pat. No. 5,998,520. The polycarbonates are generally aromatic polycarbonates having a weight average molecular weight of from 10,000 to 200,000, e.g., 20,000 to 80,000, and a melt flow rate, as measured by ASTM D-1238 at 300° C., of from 1 to 65 g/10 min., preferably from 2 to 15 g/10 min. The aforedescribed polycarbonates may be prepared from a carbonic acid derivative, such as phosgene, and dihydroxy compounds by polycondensation using the known diphasic interfacial process. See, column 2, line 55 to column 4, line 47 of the aforementioned '520 U.S. Patent for a description of suitable dihydroxy compounds, the most preferred of which is 2,2-bis-(4-hydroxyphenyl)-propane (bisphenol A). Such disclosure is incorporated herein by reference.

Suitable polycarbonate resins that are commercially available include, for example, MAKROLON FCR 2400, MAKROLON CD 2005, MAKROLON 2600, MAKROLON 2800 and MAKROLON 3100, all of which are bisphenol-based homopolycarbonate resins of varying molecular weights and melt flow indices. A branched polycarbonate, such as MAKROLON 1239, can also be used. See also U.S. Pat. Nos. 3,030,331; 3,169,121; 3,395,119; 3,729,447; 4,225,556; 4,260,731; 4,369,303 and 4,714,746 for descriptions of useful polycarbonates and their methods of preparation. The disclosures of such patents are incorporated herein by reference.

Transparent, non-elastomeric polyurea urethanes useful for architectural glazings, vehicle transparencies, e.g., sidelights and backlights, aircraft canopies, face masks, visors, ophthalmic lenses and sun lenses have been described in the art. See, for example, U.S. Pat. No. 6,127,505, the disclosure of which is incorporated herein by reference. These polyurea urethanes are described as having good optical clarity, good ballistic properties, high chemical resistance and high heat distortion temperatures. Polyurea urethanes are prepared from one or more polyols having greater than one hydroxyl group per molecule, e.g., a dihydroxy polyol, at least one polyisocyanate having greater than one isocyanato group per molecule, e.g., a diisocyanate, and at least one polyamine having more than one amino group per molecule, e.g., a diamine. Optionally, a polyol having greater than two hydroxyl groups per molecule is also used as a reactant. The term "non-elastomeric", as used with respect to the polyurea urethane, means that the referenced article cannot be stretched to twice its length and then return to its original length when the tension is released.

Typically, the polyurea urethane is prepared by the prepolymer method. In such method, at least one polyol, e.g., polyester polyol, polycaprolactone polyol, polyether polyol, polycarbonate polyol or mixtures of such polyols, each of which polyols have a weight average molecular weight of from 400 to 2000, e.g., 400 to 1000, is reacted with a polyisocyanate in an equivalent ratio that provides from 2.5 to 4.0 isocyanato (NCO) groups for each hydroxyl (OH) group, thereby to form the prepolymer having free isocyanate groups. This prepolymer is then reacted with at least one polyamine compound in an equivalent ratio of from 0.85 to 1.02 amino ($NH_2$) groups to 1.0 isocyanato (NCO) group, usually from 0.90 to 1.0 amino groups to 1.0 isocyanato group, more usually from 0.92 to 0.96 amino groups to 1.0 isocyanato group. The polyurea urethanes may also be prepared by the one shot or quasi-prepolymer methods. In the one shot method, all of the reactants are mixed together at one time. In the quasi-prepolymer method, 30 to 80 percent of the total amount of polyol reactant is reacted with the polyisocyanate to form a prepolymer, and then the remaining 20 to 70 percent of the polyol reactant is added to the prepolymer with the polyamine curing agent.

Polyester polyols that have been found suitable for preparing the polyurea urethane include the esterification product of one or more saturated dicarboxylic acids having from 4 to 10, preferably 6 to 9, carbon atoms, such as adipic, succinic and sebacic acids, with a stoichiometric excess of one or more low molecular weight glycols having from 2 to 10, e.g., 4 to 8, carbon atoms, such as ethylene glycol, propylene glycol, diethylene glycol, 1,4-butane diol, neopentyl glycol, 1,6-hexane diol and 1,10-decane diol so as to produce a hydroxyl terminated product. Examples of specific polyester polyols are the esterification products of adipic acid with glycols having from two to ten carbon atoms. Polycaprolactone glycols include the reaction products of epsilon-caprolactone with one or more of the aforementioned low molecular weight glycols. See also the later discussion with respect to polyester polyols used to prepare polyurethanes for the polymeric protective film. Polyether polyols include those mentioned hereinafter with respect to the thermoplastic polyurethane film, e.g., polytetramethylene glycol. Polycarbonate polyols include aliphatic polycarbonate glycols, such as those mentioned hereinafter with respect to the thermoplastic polyurethane film. The aforementioned polyols are well known to those skilled in the art and many are commercially available from manufacturers such as Ruco Polymer Corp., Solvay Interox and Enichem.

Small amounts of a tri-functional or higher functional polyol, e.g., a triol, may be added to the prepolymer to produce a small amount of cross-linking, e.g., one percent, in the polyurea urethane. Generally, from 4 to 8 weight percent of such a polyol, e.g., triol, basis the total weight of the reactants, is sufficient to produce the desired level of cross-linking. Triols that are useful include trimethylol ethane and trimethylol propane. These multifunctional polyols are commercially available. Various other additives, such as antioxidants, ultraviolet stabilizers, color blockers, optical brighteners and mold release agents, may also be added to the prepolymer prior to its reaction with the polyamine compound.

Polyisocyanates useful in the preparation of the polyurea urethane are numerous and widely varied. Non-limiting examples of types of polyisocyanates include aliphatic polyisocyanates, cycloaliphatic polyisocyanates wherein one or more of the isocyanato groups are attached directly to the cycloaliphatic ring, cycloaliphatic polyisocyanates wherein one or more of the isocyanato groups are not attached directly to the cycloaliphatic ring, aromatic polyisocyanates wherein one or more of the isocyanato groups are attached directly to the aromatic ring, and aromatic polyisocyanates wherein one or more of the isocyanato groups are not attached directly to the aromatic ring. When an aromatic polyisocyanate is used, care should be taken to select a material that does not cause the polyurea urethane to color, e.g., yellow.

A particularly contemplated polyisocyanate is the cycloaliphatic diisocyanate, 4,4'-methylene bis(cyclohexyl isocyanate), which is commercially available from Bayer Corporation under the designation DESMODUR W. 4,4'-methylene bis(cyclohexyl isocyanate) is available as trans-trans, cis-cis, and cis-trans isomers. Usually, this diisocyanate product is sold as a mixture of the isomers. The isomer ratio of DESMODUR W is reported by Bayer Corp. to be 17-24 weight percent of the cis-cis isomer, 47-54 weight percent of the cis-trans isomer, and 17-24 weight percent of the trans-trans isomer. Other suitable polyisocyanates are described hereinafter in connection with the disclosure of isocyanates with respect to the thermoplastic polyurethane film material, and such disclosure is incorporated herein by reference.

Although no catalyst is required during prepolymer formation, the use of a catalyst is often desirable. When a catalyst is used, organometallic catalysts, such as for example, the organometallic tin, lead, iron, bismuth, or mercury compounds are used. Organotin compounds such as dibutyltin dilaurate are particularly useful. Catalyst concentration is typically in the range of from 25 to 1000 parts by weight of catalyst to one million parts of total reactants.

The polyamine curing agent has more than one amino group per molecule, each amino group being independently selected from primary amino (—NH$_2$) and secondary amino (—NH—) groups. Such polyamines are numerous and widely varied, and many are commercially available from Albemarle Corp. under the ETHACURE tradename, and from Lonza Ltd. under the LONZACURE tradename. In one contemplated embodiment, the amino groups are all primary groups. The polyamine curing agent can be selected from aliphatic polyamines, cycloaliphatic polyamines, aromatic polyamines, and mixtures of such polyamines. It is useful if the amine has a relatively low color and/or be manufactured and/or stored in such a manner as to prevent the amine from developing a color, e.g., from yellowing, in order to produce a polyurea urethane that has a low color.

Non-limiting examples of polyamine curing agents include aliphatic diamines having from 2 to 10 carbon atoms, such as 1,2-ethane diamine, 1,3-propane diamine, 1,4-butane diamine, 1,5-pentane diamine, 1,6-hexane diamine, 1,8-octane diamine, and 1,10-decane diamine; aromatic diamines, such as 1,2-benzene diamine, 1,3-benzene diamine, 1,4-benzene diamine, 1,5-naphthalene diamine, 1,8-naphthalene diamine, 2,4-toluene diamine, 2,5-toluene diamine, 3,3'-dimethyl-4,4'-biphenyldiamine, 4,4'-methylene bis(aniline), 4,4'-methylene bis(2-chloroaniline) and dialkyl toluene diamines in which the alkyl groups each contain from 1 to 3 carbon atoms, such as 3,5-dimethyl-2,4-toluene diamine, 3,5-dimethyl-2,6-toluene diamine, 3,5-diethyl-2,4-toluene diamine, 3,5-diethyl-2,6-toluene diamine, 3,5-diisopropyl-2,4-toluene diamine, and 3,5-diisopropyl-2,6-toluene diamine. The dialkyl toluene diamines typically are sold as isomeric mixtures, e.g., an isomeric mixture of 3,5-diethyl-2,4-toluene diamine and 3,5-diethyl-2,6-toluene diamine. Other amines than can be mentioned include 4,4'-methylene-bis(dialkylaniline) in which the alkyl groups each contain from 1 to 3 carbon atoms, such as 4,4'-methylene bis(2,6-dimethylaniline), 4,4'-methylene bis(2,6-diethylaniline), 4,4'methylene bis(2-ethyl-6-methylaniline), 4,4'-methylene bis(2,6-diisopropylaniline), 4,4'-methylene bis(2-isopropyl-6-methylaniline) and 4,4'-methylene bis(2,6-diethyl-3-chloroaniline). The polyamines may contain more than two amino groups, such as diethylenetriamine, triethylenetetramine and tetraethylenepentamine.

The polyurea urethane can be prepared by casting or compression molding methods. Typically, it is prepared by reaction injection molding methods, e.g., by injecting the prepolymer composition and polyamine curing agent into a mold and curing the reaction mixture. In a contemplated method, the prepolymer is first prepared by reacting the polyisocyanate(s) and the polyol(s) used in an NCO/OH equivalent ration in the range of from 1.3:1 to 4.5:1, e.g., 2.4:1 or 2.7:1 to 4:1, at temperatures of from 40° C. to 145° C., e.g., 70° C. to 135° C. or 90° C. to 130° C., under a blanket of non-reactive gas, such as nitrogen or helium. Inasmuch as the isocyanate compound is used in excess, the prepolymer is an isocyanate terminated product. Reaction times will vary with the reaction temperature. Generally, the higher the temperature, the shorter the reaction times required. Reaction times at the aforedescribed temperatures will generally vary from 3 minutes to 24 hours, e.g., 10 to 60 minutes. Subsequent to the initial reaction, the molded polyurea urethane may be post-cured by heating it in an oven for several hours, e.g., at 90 to 130° C. for 0.5 to 10 hours, e.g., 1 to 5 hours.

The polyurethane film attached to at least one surface of the transparent optical substrate is transparent and thermoplastic, i.e., the polyurethane film is formable by moderate heat and pressure. Typically, the polyurethane film is substantially colorless and optically clear, as opposed to translucent or opaque. Mildly cross-linked thermoset polyurethanes, i.e., polyurethanes that are not highly cross-linked, are often termed pseudo-thermoset materials because they are formable by mild heat and pressure. Such pseudo-thermoset materials are intended to be included in the definition of "thermoplastic" for purposes of this disclosure relative to the polyurethane film. When used alone (or as part of a multi-ply laminate), the polyurethane film will typically have a thickness of from 1 to 20 mils [0.001 to 0.020 inches] (0.025 to 0.5 mm), more typically from 2 to 15 mils (0.05 to 0.375 mm), and still more typically from 3 or 3.5 to 10 mils (0.075 or 0.0875 to 0.25 mm), e.g., 7 mils (0.175 mm).

The average flexural modulus, of the thermoplastic polyurethane film will typically be less than 2.5 GPa (giga pascals), more typically, less than 1, and still more typically less than 0.5, e.g., less than 0.05 GPa. The flexural modulus of a material is the ratio of stress to strain when the material is placed in flexural deformation. The procedure for measuring the flexural modulus (flex modulus) of a material is described in the test method ASTM D790 (American Society for Testing Materials). ASTM D790 is a method to measure the flexural strength of a material; namely, the ability of a material, i.e., the thermoplastic polyurethane film, to resist deformation under a load. In this test method, the specimen is placed on two supports and a load is applied at the center. The specimen is under compressive strength at the concave surface and tensile stress at the convex surface. For materials that do not break, the load at yield (the measure of a materials flexural strength or flexural yield) is typically measured at 5% deformation/strain of the outer surface. Further, the thermoplastic polyurethane film will have an instantaneous Shore A hardness value of less than 65, e.g., between 50 and 65. Determination of the Shore A hardness of a material is described in ASTM D 1706 and D 2240 test methods. These methods use a durometer for measuring the indentation hardness of a material. In the test, the depth of indentation under load is measured when a hardened steel indentor is forced into a specimen by means of a calibrated spring. The scale is graduated and has a value from 0 to 100.

As is well known in the art, polyurethanes are those materials that are produced by the catalyzed or uncatalyzed reaction of (a) an organic polyol component having a nominal functionality of from 2 to 4, (b) an organic glycol component, i.e., diols and/or triols, which has a nominal functionality of from 2 to 3, and (c) a polyisocyanate component having a nominal functionality of from 2 to 3. The organic polyol component and the organic glycol component can each comprise a mixture of two or more organic polyols or two or more organic glycols. The polyisocyanate component may also comprise a mixture of two or more isocyanates. The thermoplastic polyurethane film of the present invention is prepared from the organic polyol component(s), comprising a polyether polyol and/or a polycarbonate polyol. Minor amounts, i.e., less than 49 weight percent, more usually less than 35 weight percent, e.g., less than 25 weight percent, as for example from 0.5 to 20 weight percent, of polyester polyol can be included in the organic polyol component, thereby to include polyester-based polyurethane in the thermoplastic polyurethane film. However, it has been observed that in the embodiment where the light filtering property is photochromism, the photochromic materials exhibit an increased rate of fatigue when the principal or primary organic polyol used to prepare the thermoplastic polyurethane film is a polyester polyol. Consequently, the amount of polyester polyol included should be insufficient to adversely affect the fatigue rate of the photochromic material. As used in this description and the accompanying claims, the terms polyether-based polyurethane and polycarbonate-based polyurethane material is intended to mean that the polyurethane film is prepared using as the principal organic polyol component one or more polyether polyols and/or one or more polycarbonate polyols. In the embodiment wherein the resin film contiguous to the surface of the substrate is a polyurethane substantially free of photochromic material, the polyurethane film can in addition be prepared from at least one polyester polyol, as described hereinafter, i.e., the polyurethane film can be a polyester-based polyurethane.

Polyether polyols and methods for their preparation are well known to those skilled in the art. Many polyether polyols of various types and molecular weight are commercially available from various manufacturers. Polyether polyols that can be used to prepare the thermoplastic polyurethane of the present invention generally have a number average molecular weight of from 500 to 3000, more usually from 650 to 2000, and preferably from 650 to 1400, e.g., from 850 to 1000 or 1200. The number average molecular weight of the polyether polyol can range between any of the enumerated molecular weights.

Non-limiting examples of polyether polyols include polyoxyalkylene polyols, and polyalkoxylated polyols. Polyoxyalkylene polyols can be prepared in accordance with well known methods by condensing an alkylene oxide, or a mixture of alkylene oxides, using acid or base catalyzed addition with a polyhydric initiator or a mixture of polyhydric initiators, such as ethylene glycol, propylene glycol, glycerol, sorbitol and the like. Illustrative alkylene oxides include ethylene oxide, propylene oxide, butylene oxide, amylene oxide, aralkylene oxides, e.g., styrene oxide, mixtures of ethylene oxide and propylene oxide, etc. Polyoxyalkylene polyols prepared with mixtures of alkylene oxide can be prepared using random or step-wise oxyalkylation. Examples of such polyoxyalkylene polyols include polyoxyethylene, i.e., polyethylene glycol, polyoxypropylene, i.e., polypropylene glycol.

Polyalkoxylated polyols may be represented by the following general formula I,

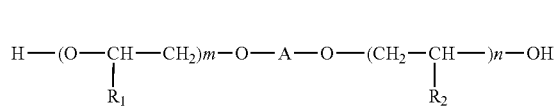

Wherein m and n are each a positive number, the sum of m and n being from 5 to 70, $R_1$ and $R_2$ are each hydrogen, methyl or ethyl, preferably hydrogen or methyl, and A is a divalent linking group, e.g., a straight or branched chain alkylene (usually containing from 1 to 8 carbon atoms, phenylene, and $C_1$ to $C_9$ alkyl substituted phenylene. The chosen values of m and n will, in combination with the chosen divalent linking group, determine the molecular weight of the polyol. Polyalkoxylated polyols may be prepared by methods that are will know in the art. One such commonly used method involves reacting a polyol, e.g., 4,4'-isopropylidenediphenol, with an oxirane containing substance, e.g., ethylene oxide, propylene oxide, a butylene oxide, to form what is commonly referred to as an ethoxylated, propoxylated or butoxylated polyol having hydroxy functionality. Examples of polyols that may be used in preparing polyalkoxylate polyols include those polyols described in U.S. Pat. No. 6,187,444 B1 at column 10, lines 1-20, which disclosure is incorporated herein by reference.

As used herein, the term polyether polyols also include the generally known poly(oxytetramethylene)diols prepared by the polymerization of tetrahydrofuran in the presence of Lewis acid catalysts, such as boron trifluoride, tin(IV) chloride and sulfonyl chloride. Also included are the polyethers prepared by the copolymerization of cyclic ethers, such as ethylene oxide, propylene oxide, trimethylene oxide, and tetrahydrofuran with aliphatic diols such as ethylene glycol, 1,3-butanediol, 1,4-butanediol, diethylene glycol, dipropylene glycol, 1,2-propylene glycol and 1,3-propylene glycol. Compatible mixtures of polyether polyols may also be used. Those skilled in the art will appreciate that the term "compatible" means that the polyols are mutually soluble in each other so as to form a single phase.

Polycarbonate polyols are known in the art and are commercially available e.g., Ravecarb™ 107 (Enichem S.p.A.). These materials may be produced by the reaction of an organic glycol, e.g., a diol, such as those described hereinafter and in connection with the glycol component of the polyurethane, and a dialkyl carbonate, as described in U.S. Pat. No. 4,160,853. Of particular utility is polyhexamethylene carbonate, i.e., H—(O—C(O)—O—(CH$_2$)$_6$)n-OH, wherein n is a positive number of from 4 to 24, e.g., 4 to 10 or 5 to 7. The number average molecular weight of the polycarbonate polyols can range from 500 to 3500, e.g., 650 to 1000. The particular value of n will determine the molecular weight of the polyhexamethylene carbonate.

The organic glycol component comprises low molecular weight polyols, i.e., polyols having a molecular weight of less than 500. These polyols are typically low molecular weight diols and triols. Mixtures of compatible organic glycols can be used. By compatible is meant that the glycols are mutually soluble in each other so as to form a single phase. Care should be taken that the amount of triol used as part of the organic glycol component avoids a high degree of cross-linking in the polyurethane, with the consequent preparation of a thermoset polyurethane that is not formable by moderate heat and pressure. The organic glycol component typically contains from 2 to 16, e.g., 2 to 6 or 10, carbon atoms. Non-limiting examples of such glycols include: ethylene glycol, propylene glycol, diethylene glycol, triethylene glycol, tetraethylene glycol, dipropylene glycol, tripropylene glycol, 1,2-, 1,3- and 1,4-butanediol, 2,2,4-trimethyl -1,3-pentanediol, 2-methyl-1,3-pentanediol, 1,3-, 2,4- and 1,5-pentanediol, 2,5- and 1,6-hexanediol, 2,4-heptanediol, 2-ethyl-1,3-hexanediol, 2,2-dimethyl-1,3-propanediol, 1,8-octanediol, 1,9-nonanediol, 1,10-decanediol, 1,4-cyclohexanediol, 1,4-cyclohexanedimethanol, 1,2-bis(hydroxyethyl)-cyclohexane, glycerin, tetramethylolmethane, i.e., pentaerythritol, trimethylolethane, and trimethylolpropane. Other isomers of the foregoing described glycols may also be used. The amount of the organic glycol component used in relation to the polyether polyol and/or polycarbonate polyol component may vary from 3 to 20 weight percent.

The isocyanate component is supplied by one or more organic isocyanates having a nominal functionality of from 2 to 3, preferably 2. The isocyanate component includes modified, unmodified and mixtures of modified and unmodified isocyanate compounds having free, blocked or partially blocked isocyanate groups. The term modified means that the isocyanate is changed in a known manner to introduce biuret, urea, carbodiimide, urethane or isocyanurate groups. Fully blocked isocyanates are described in U.S. Pat. No. 3,984,299 (column 1, line 57 through column 3, line 15). Partially blocked isocyanates are described in U.S. Pat. No. 3,947,338 (column 2, line 65 to column 4, line 30). The organic isocyanate may be selected from aliphatic, cycloaliphatic, and mixed aliphatic-aromatic isocyanates. Mixtures of such isocyanates may be used.

The isocyanate component can be selected from aliphatic isocyanates, cycloaliphatic isocyanates, blocked aliphatic isocyanates, blocked cycloaliphatic isocyanates and mixtures of such isocyanates. Non-limiting examples of suitable isocyanate components include tetramethylene-1,4-diisocyanate, hexamethylene-1,6-diisocyanate, 2,2,4-trimethylhexane-1,6-diisocyanate, cyclobutane-1,3-diisocyanate, cyclohexane-1,3-diisocyanate, cyclohexane-1,4-diisocyanate, methyl cyclohexyl diisocyanate, e.g., 2,4- and 2,6-methyl cyclohexyl diisocyanate, isophorone diisocyanate, the isomers and mixtures of isomers of 4,4'-methylene-bis(cyclohexyl isocyanate), i.e., the trans-trans, cis-cis and cis-trans isomers, hexahydrotoluene-2,4-diisocyanate, hexahydrotoluene-2,6-diisocyanate, hexahydrophenylene-1,3-diisocyanate, hexahydrophenylene-1,4-diisocyanate, hexahydrophenylene-1,4-diisocyanate, and phenyl cyclohexylmethane diisocyanate, The polyurethane-forming components are combined in a ratio typically expressed as a ratio of the available number of reactive isocyanate groups to the available number of reactive hydroxyl groups, i.e., an equivalent ratio of NCO:OH. The equivalent ratio of NCO:OH that can be used to prepare the thermoplastic polyurethane of the present invention can range between 0.7 and 2.0, usually between 0.9 and 1.2. The NCO in the NCO:OH ratio represents the free isocyanate of free isocyanate-containing compounds, and of blocked or partially blocked isocyanate-containing compounds after the release of the blocking agent.

Suitable urethane-forming catalysts can be used to enhance the reaction of the polyurethane-forming components. Suitable urethane-forming catalysts are those catalysts that are highly specific for the formation of urethane by reaction of the NCO and OH groups and which have little tendency to accelerate side reactions leading to allophonate and isocyanate formation. For example, catalysts that may be used to cure polyurethane reaction mixtures may be selected from the group consisting of Lewis bases, Lewis acids and insertion catalysts described in Ullmann's Encyclopedia of Industrial Chemistry, $5^{th}$ Edition, 1992, Volume A21, pp. 673 to 674. Usually the catalyst is a stannous salt of an organic acid, e.g., stannous octoate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2] octane. Mixtures of tin catalysts can be used. Other tin catalysts described in the art may be used as well.

The amount of catalyst used for a particular system can be determined routinely by one skilled in the art. For example, dibutyltin dilaurate is usually employed in amounts of from 0.0005-0.02 parts per 100 parts of the polyurethane-forming components. The amount of catalyst needed depends on the curing temperature used. While organotin catalysts are preferred, other catalysts can be used.

The thermoplastic polyurethane can be prepared by the one-shot, quasi-prepolymer or full prepolymer procedures, all of which are well known in the art. In the one-shot procedure, the isocyanate, polyol and glycol components are mixed together and reacted simultaneously. In the full prepolymer procedure, the isocyanate is reacted with the polyol to prepare an isocyanato-terminated prepolymer, which is then reacted with the glycol component. In the quasi-prepolymer procedure the isocyanate is reacted with a portion of the polyol component and in a subsequent step the glycol component and the remaining part of the polyol component are mixed with the prepolymer prepared in the first step.

One method of producing the polyurethane film is to introduce the reactants continuously into a reactor-extruder, which is maintained at reaction temperatures, e.g., 140-210° C., and extrude the resulting polyurethane continuously in the form of a film. The film can be calendered to the desired thickness if the extruded film is too thick. This method can be used with the one-shot, quasi- or full prepolymer methods. Another method is to prepare the polyurethane in bulk form by reacting the polyurethane-forming components in a suitable reactor at appropriate reaction temperatures, e.g., from 50 to 150° C., particularly, 100 to 140° C., e.g., 120° C., forming particulates from the bulk form, and then processing the particulates with a suitable extruder to prepare the polyurethane film. Conventional rubber mills and conventional extruders can be employed to prepare particulates of the polyurethane and form the polyurethane into a film of the desired thickness.

In accordance with an embodiment of the present invention, the polyurethane film provides the desired light filtering property to the article by incorporating the material that provides such property into the polyurethane film. For example, when the light filtering property is photochromism or a tint, organic photochromic substances and/or dyes are incorporated into the polyurethane film. This may be accomplished by mixing the photochromic substances and/or coloring dyes with the polyurethane reactants, e.g., with one or more of the polyol reactants; by mixing the photochromic substances and/or dyes with particulates of the already formed polyurethane and then extruding the mixture into a film; or by imbibition, permeation, diffusion or other known dye transfer methods. Since many organic photochromic substances and dyes decompose under the reaction conditions used to prepare polyurethanes, it is more advantageous to incorporate those materials into the bulk polyurethane after it has been prepared and cooled and prior to its being formed into a film.

The amount of organic photochromic substance that is incorporated into the polyurethane film is an amount that is sufficient to provide a sufficient quantity of the organic photochromic substance to produce a film that exhibits the desired change in optical density ($\Delta$OD) when the film is exposed to ultraviolet (UV) radiation, i.e., a photochromic amount. Typically, the change in optical density measured at 22° C. (72° F.) after 30 seconds is at least 0.05, e.g., at least 0.15, and more typically at least 0.20. The change in optical density after 15 minutes is typically at least 0.10, more typically at least 0.50, and still more typically at least 0.70.

The bleach rate of the photochromic polyurethane film, as reported in terms of the fading half-life (T $\frac{1}{2}$), is typically not more than 500 seconds, more typically not more than 190 seconds, and still more typically not more than 115 seconds. The bleach rate is the time interval in seconds for the change in optical density ($\Delta$OD) of the activated form of the photochromic film to reach one half the highest $\Delta$OD after removal of the source of activating light. The aforedescribed values for change in optical density and bleach rate are measured at 22° C. (72° F.).

Stated differently, the amount of active photochromic material used in the photochromic film can range from 0.2 to 20.0 weight percent, based on the total weight of the polyurethane film. The relative amounts of photochromic materials used will vary and depend in part upon the relative intensities of the color of the activated species of the photochromic compounds, the ultimate color desired, and the solubility or dispersibility of the photochromic material in the polymeric coating. Care should be taken to avoid use of an amount of photochromic material, which causes crystals of the photochromic compound to be formed in the film. Usually, the concentration of active photochromic material in the photochromic polyurethane film ranges from 0.2 to 10 weight percent, more usually, from 0.3 to 5 weight percent, and still more usually from 0.5 to 1 weight percent. The amount of photochromic substance in the film may range between any combination of these values, inclusive of the recited values.

Photochromic materials, e.g., photochromic compounds or compositions containing such photochromic materials, that can be utilized with the polyurethane film are organic photochromic compounds and/or substances containing such organic photochromic compounds. The particular photochromic material(s), e.g., compound(s), selected is not critical, and its/their selection will depend on the ultimate application and the color or hue desired for that application. When two or more photochromic compounds are used in combination, they are generally chosen to complement one another to produce a desired color or hue. Organic photochromic compounds, or substances containing same, used in the photochromic coating commonly have at least one activated absorption maxima within the visible spectrum of between 400 and 700 nanometers. The organic photochromic material is typically incorporated, e.g., dissolved or dispersed, in the polyurethane film and color when activated, i.e., when exposed to ultraviolet radiation, the photochromic material(s) changes to the color or hue that is characteristic of the colored form of such material(s).

In one contemplated embodiment, the organic photochromic material comprises:

(a) at least one photochromic organic compound having a visible lambda max of from 400 to less than 550, e.g., from 400 to 525, nanometers; and (b) at least one photochromic organic compound having a visible lambda max of greater than 525 nanometers, e.g., from 525 or 550 to 700 nanometers.

Non-limiting examples of photochromic compounds that may be used in the photochromic coating include, but are not limited to, indolino spiropyrans, such as benzopyrans, naphthopyrans, e.g., naphtho[1,2-b]pyrans, naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767; indolino spirooxazines, such as, benzoxazines, naphthoxazines, and spiro(indolino) pyridobenzoxazines. Specific examples of naphthopyrans include, but are not limited to, the naphthopyrans described in U.S. Pat. No. 5,658,501, and the complementary organic photochromic substances disclosed in that patent from column 11, line 57 through column 13, line 36. Other photochromic substances contemplated for use herein are photochromic metal dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38; and mixtures of the aforementioned photochromic materials/compounds.

In addition, it is contemplated that organic photochromic materials such as photochromic pigments and photochromic compounds encapsulated in metal oxides can be used in the photochromic film. See, for example, the materials described in U.S. Pat. Nos. 4,166,043 and 4,367,170. The disclosures relating to photochromic compounds and materials in the aforedescribed patents are incorporated herein, in toto, by reference.

The polyurethane film can contain one photochromic compound or a mixture of two or more photochromic compounds, as desired. Mixtures of photochromic compounds can be used to attain certain activated colors such as a near neutral gray or near neutral brown. See, for example, U.S. Pat. No. 5,645,767, column 12, line 66 to column 13, line 19, the disclosure of which is incorporated herein by reference, which describes the parameters that define neutral gray and brown colors.

In addition to photochromic materials, the polyurethane film (or precursor physical form) can contain additional conventional adjuvants that impart desired properties or characteristics to the film, or which enhance the performance of the film. Such adjuvants include, but are not limited to, light stabilizers, heat stabilizers, free radical scavengers, plasticizers, flow additives and other processing aids.

Further, additional adjuvant materials can be incorporated into the polyurethane film to enhance the performance of the photochromic material. Such adjuvant materials can include ultraviolet light absorbers, stabilizers, such as hindered amine light stabilizers (HALS), antioxidants, e.g., polyphenolic antioxidants, asymmetric diaryloxalamide (oxanilide) compounds, singlet oxygen quenchers, e.g., a nickel ion complex with an organic ligand, and mixtures of such photochromic performance enhancing adjuvant materials. See, for example, the materials described in U.S. Pat. Nos. 4,720,356, 5,391, 327 and 5,770,115, the disclosures of which are incorporated herein by reference.

Compatible (chemically and color-wise) tints, i.e., dyes, can be added to the polyurethane film to obtain a more desired light filtering property. The tint can be added to the polyurethane film by itself, i.e., without photochromic dyes, to obtain a light filtering property, for medical reasons or for reasons of fashion, e.g., to achieve a more aesthetic result. The particular dye selected will depend on the aforesaid need and result to be achieved. In addition, the tint can be added in combination with the photochromic compound(s), e.g., the tint can be selected to complement the color resulting from the activated photochromic materials used, e.g., to achieve a more neutral color or absorb a particular wavelength of incident light. In another contemplated embodiment, the dye is selected to provide a desired hue to the film when the photochromic material is in a non-activated state.

In a further contemplated embodiment, the tint/dye can be incorporated into the protective polymeric film or a separate otherwise transparent polymeric film prepared from a conventional resin and the tinted film affixed to the polyurethane film or placed in a stack of films comprising the laminate adhered to the surface of the solid substrate. Suitable conventional resins include polymers and copolymers of various materials, such as those described herein, and cellulose acetate butyrate, cellulose nitrate, cellulose triacetate, poly (lower alkyl acrylates and methacrylates), such as poly(methyl methacrylate) and polyacrylate, polyethylene, polypropylene, poly(acrylonitrile), poly(vinyl acetate), poly(vinyl chloride), polystyrene and polybutadiene. By lower alkyl is meant that the alkyl groups contains from 1 to 5 carbon atoms, e.g., methyl, ethyl, propyl, butyl and pentyl (including isomers of such alkyl groups)

When light polarization is the light filtering characteristic desired for the optical article, it is contemplated that the polyurethane film will comprise a laminate of a polyurethane film and a separate light polarizing film or sheet, which is superposed on the polyurethane film. It is also contemplated that the optical article provide a combination of light filtering properties, e.g., photochromism and light polarization, and photochromism, light polarization and tinting. In such embodiments, the thermoplastic polyurethane film can contain photochromic materials, or photochromic materials and tinting dyes (as described above).

The base resin for the light polarizing film can be selected from a variety of suitable resins used as a host for dichroic dyes that are used for imparting the property of light polarization. Non-limiting examples of such resins include poly(vinyl alcohol), poly(vinyl formal), poly(vinyl acetal), polyethylene terephthalate, and saponified ethylene/vinyl acetate (EVA) copolymer film. Poly(vinyl alcohol) is a contemplated resin. The film is commonly stretched (oriented). Typically, the light polarizing film has a thickness of from 0.1 to 3 mils (0.0025 to 0.076 mm), such as 0.5 to 1.5 mils (0.0125 to 0.0375 mm), e.g., 1 mil (0.025 mm), and contains a linear molecularly oriented dichroic material, such as iodine. The dichroic substance incorporated into the base film or resin may either be a single dichroic substance or a mixture that includes two or more dichroic substances.

Other examples of suitable dichroic substances, such as dichroic dye, for imparting the light polarizing property to the base film or resin may be found in U.S. Pat. No. 5,051,309 to Kawaki et al. Non-limiting examples of dichroic substances include: Chlorantine Fast Red (C.I. 28160), Chrysophenine (C.I. 24895), Sirius Yellow (C.I. 29000), Benzopurpurine (C.I. 23500), Direct Fast Red (C.I. 23630), Brilliant Blue 6B (C.I. 24410), Chlorazol Black BH (C.I. 22590), Direct Blue 2B (C.I. 22610), Direct Sky Blue (C.I. 24400), Diamine Green (C.I. 30295), Congo Red (C.I. 22120) and Acid Black (C.I. 20470).

The polarizing film can be free standing (non-laminated), or have one or more outer permanent protective coatings or supportive plastic layer. The use of one or more support sheets can be employed to improve the durability and handling characteristics of the light polarizing film. Support sheets of cellulose acetate, cellulose acetate-butyrate, cellulose triacetate, or other transparent polymeric materials, such as those described above for the dichroic dye and tinting dye, can be used. For example, a supported polarizing film can be prepared by sandwiching a layer of poly(vinyl alcohol) polarizing material between a pair of cellulose triacetate films/sheets, each having a thickness of from 1 to 5 mils (0.025 to 0.125 mm). It is contemplated that the separate support films/sheets, and carrier sheets for the dichroic dye or tinting dye be transparent, e.g., optically clear, formable (moldable) with moderate heat and pressure, have low birefringence and good heat resistance. When the polarizing film is sandwiched between two support sheets, the polarizing film is superposed on the thermoplastic polyurethane film with one of the support sheets being juxtaposed to the polyurethane film.

In accordance with the present invention, a protective film of polymeric material is superposed on the thermoplastic polyurethane film. This protective polymeric film is also transparent, except if a tint or dye is incorporated into the polymeric material for the purpose of filtering light passing through the film or to complement the photochromic dye(s) incorporated into the polyurethane film material. When a polarizing film (free standing or supported) is superposed on the polyurethane film, the protective film can be attached to the polarizing film or a support film/sheet attached to the polarizing film. In such an embodiment, a laminate comprising, in sequence, the thermoplastic polyurethane film, polarizing film and protective film is contemplated. However, if the polarizing film is not pervious to ultraviolet light (UV) radiation, i.e., the polarizing film (or its support sheet) absorbs a significant amount of UV radiation, i.e., an amount which interferes with the photochromic function of photochromic materials (and the polyurethane film contains photochromic material(s), the order of the polarizing film and photochromic polyurethane film can be reversed, i.e., a laminate comprising, in sequence, polarizing film, photochromic polyurethane film, and protective film. Hence, the polarizing film should be compatible with the function of the photochromic polyurethane film; namely, it should be sufficiently permeable to UV light radiation to allow such radiation to reach the photochromic material(s) and allow the photochromic material(s) to change to the colored form. Also contemplated, is a laminate comprising, in sequence, polyurethane adhesive film, polarizing film, photochromic polyurethane film, and protective film. A resin film containing a tinting dye can also be contained within the laminate.

The transparent protective film is a polymeric material that does not impair the optical properties or optical quality of the combined optical substrate and laminate comprising the thermoplastic polyurethane film, is formable by moderate heat and pressure without producing optical distortion, has a softening point temperature that is higher than the glass transition temperature of the polyurethane film and the polarizing film (or the adjacent supporting film), and can be coated with abrasion-resistant coatings, i.e., is compatible with such coatings. Advantageously, the protective film is optically clear. The transparent protective film should exhibit other physical properties, such as a haze level of less than 2%; and a light transmittance of at least 70, preferably at least 80, more preferably, at least 85% and most preferably at least 90%. The melting temperature of the transparent protective film should be greater than 120° C., and have a flexural modulus of less than 5 GPa, e.g., from 0.1 to 5 GPa, preferably from 0.5 to 3 GPa, and more preferably from 1 to 2 GPa. As described in connection with the thermoplastic polyurethane film, the flexural modulus of the protective film can be determined in accordance the ASTM D790 test method. It is contemplated that the transparent protective film will have an abrasion resistance that is greater than the thermoplastic polyurethane film, as measured by conventional abrasion tests, e.g., the Bayer Abrasion Test.

The transparent protective film will typically have a thickness of from 1 to 20 mils (0.025 to 0.5 mm), more usually from 5 to 10 mils (0.125 to 0.25 mm). As used herein, the term "film" has the generally accepted meaning of a layer with a thickness of not more than 20 mils (0.5 mm), e.g., less than 20 mils (0.5 mm); while the generally accepted meaning of a "coating" is a layer with a thickness of not more than 4 mils (0.1 mm). In contrast, the thickness of a "sheet" is generally considered to be greater than 20 mils (0.5 mm).

Non-limiting examples of polymeric materials that can be used as the protective film include nylon, poly(vinyl acetate), vinyl chloride-vinyl acetate copolymers, poly(lower alkyl acrylates and methacrylates), thermoplastic polycarbonate, annealed or stretched polycarbonate, styrene-butadiene copolymer resin, e.g., K-resin, lightly cross-linked thermoplastic polyurethanes and polyurea urethanes By lower alkyl is meant an alkyl group of from 1 to 4 carbon atoms, e.g., from 1 to 2 carbon atoms. The polyurethane comprising the lightly cross-linked thermoplastic polyurethane can be a polyether-based polyurethane, a polycarbonate-based polyurethane or a polyester-based polyurethane. The polyether- and polycarbonate-based polyurethanes are discussed above and that discussion is applicable here also.

With respect to polyester-based polyurethanes, the polyurethane can be prepared using a polyester polyol as the long chain polyol reactant. All other polyurethane reaction conditions and reactants, e.g., isocyanate, glycol, catalyst, etc., as described above with respect to the polyether- and polycarbonate-based polyurethanes can be used to prepare the polyester-based polyurethane. Polyester polyols are prepared by well-known esterification techniques of saturated dicarboxylic acids or anhydrides thereof (or combinations of acids and anhydrides) with polyhydric alcohols. Such polyester polyols and there method of preparation are well known to the polyester chemist. As used herein, the term "polyester" is meant to include polylactones, e.g., polycaprolactone and polyvalerolactone, which can be prepared by polymerizing a lactone, such as epsilon caprolactone and delta-valerolactone, in the presence of minor amounts of difunctional active hydrogen compounds, such as water or a low molecular glycol, e.g., 1,4-butane diol.

The saturated dicarboxylic acids typically used are those containing from 4 to 10 carbon atoms, preferably from 6 to 9 carbon atoms. Non-limiting examples of such dicarboxylic acids include: succinic acid, glutaric acid, adipic acid, pimelic acid, suberic acid, azelaic acid and sebacic acid. Adipic and azelaic acids are preferred. Mixtures of dicarboxylic acids also can be used.

The polyhydric alcohol used to prepare the polyester polyol are typically aliphatic alcohols containing at least two and usually only two hydroxy groups, e.g., straight chain glycols containing from 2 to 10, e.g., 4 to 8, carbon atoms. Non-limiting examples of such alcohols are described above with respect to the polyether and polycarbonate polyols, i.e., the organic glycols. Those examples of organic glycols are equally applicable here. In a contemplated embodiment, 1,4-butane diol is used.

Polyester polyols are typically prepared by reacting together with heat the carboxylic acid component and the polyhydric alcohol, e.g., glycol, in a suitable esterification reactor. The reaction temperature will depend on the boiling point of the glycol used, but will generally be at 210° C. or below. An excess of the polyhydric alcohol is used so as to produce a hydroxyl-terminated product. Generally, an esterification catalyst, such as butyl stannoic acid, p-toluene sulfonic acid, stannous octoate, dibutyl tin dilaurate, is used, as is well known in the art.

The polyester polyol will generally have a number average molecular weight of from 1000 to 3000, preferably from 1000 to 2000. Non-limiting examples of polyester polyols include poly(butane diol-1,4-adipate), poly(butane diol-1,4-succinate), poly(butane diol-1,4-glutarate), poly(butane diol-1,4-pimelate), poly(butane diol-1,4suberate), poly(butane diol-1,4-azelate), poly(butane diol-1,4-sebacate) and poly(epsilon caprolactone).

When necessary or desired, a thin adhesive coating can be used to adhere the thermoplastic polyurethane film to the optical substrate, the polarizing film (supported or free standing) to the optical substrate or the polyurethane film, the tinting film to the polyurethane film or the polarizing film, and/or the protective film to the polyurethane film or the polarizing film. The adhesive should cure to a transparent, e.g., optically clear, thin layer, not yellow significantly upon exposure to sunlight, be compatible with the surfaces it joins together, not craze or exhibit excessive shrinkage during the process used to adhere the thermoplastic polyurethane film (or laminate comprising the polyurethane film) to the substrate, have a sufficiently high bonding strength to provide bonding between the surfaces and a sufficiently high cohesive strength to resist separation under mechanical stress to which the article may be subjected. Typically, the thin adhesive coating will be less than 25 microns thick, e.g., less than 10 or 5 microns thick, such as 1 micron thick. Light-, thermal- and UV-curable adhesives can be used. Non-limiting examples of such adhesives include those such as Dymax 469 and 492, Electro-Lite Corporation 4M12, LOCTITE® 3321, 3311, FMD 207, FMD 338, and FMD 436 (Loctite Corp.), Master Bond UV 15-7 and 15X-2, and Lite-Fast Adhesive A-109 from Micro-Lite Technology. Other adhesives that can be used include cyanoacrylates, UV-cured acrylic-type adhesives, urethane-type adhesives and epoxy-type adhesives.

In a further contemplated embodiment, an abrasion-resistant coating is applied to the exposed surface of the protective film. A conventional type of abrasion-resistant coating is the organo silane type abrasion-resistant coatings used to protect plastic surfaces from abrasions, scratches, etc. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hard coatings and which disclosures are incorporated herein by reference. Reference is also made to U.S. Pat. Nos. 4,731,264, 5,134, 191, 5,231,156 and International Patent Publication WO 94/20581 for disclosures of organo-silane hard coatings, which disclosures are also incorporated herein by reference.

Other coatings known in the art that provide abrasion and scratch resistance, such as polyfunctional acrylic hard coatings, melamine-based hard coatings, urethane-based hard coatings, alkyd-based coatings, silica sol-based hard coatings or other organic or inorganic/organic hybrid hard coatings can be used as the abrasion-resistant coating. In a particular contemplated embodiment, the coating that provides abrasion and scratch resistance comprises an organo-silane type hard coating.

By use of the term "compatible" with respect to the abrasion resistant coating (hard coat)", is meant that the protective film is capable of having a hard coat, e.g., an organo-silane hard coat, deposited on its surface and that the hard coating adheres to the protective film under ordinary handling/wear conditions, as determined by the conventional cross-hatch tape peel adhesion test. Further, by the term abrasion-resistant organo-silane containing coating (or other such similar meaning terms) is meant that the abrasion-resistant coating is prepared from a composition comprising at least one organo-silane.

In one embodiment, the hard coat may be prepared from a composition comprising from 35 to 95 weight percent, as calculated solids, of at least one silane monomer represented by the following empirical formula II:

$$R^1SiW_3 \qquad \qquad II$$

wherein $R^1$ may be glycidoxy($C_1$-$C_{20}$)alkyl, preferably glycidoxy($C_1$-$C_{10}$)alkyl, and most preferably, glycidoxy ($C_1$-$C_4$) alkyl; W may be hydrogen, halogen, hydroxy, $C_1$-$C_5$ alkoxy, $C_1$-$C_5$ alkoxy($C_1$-$C_5$)alkoxy, $C_1$-$C_4$ acyloxy, phenoxy, $C_1$-$C_3$ alkylphenoxy, or $C_1$-$C_3$ alkoxyphenoxy, said halogen being bromo, chloro or fluoro. Typically, W is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halogen is chloro or fluoro. More typically, W is hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy.

The weight percent, as calculated solids, of the silane monomers represented by empirical formula II in the hard coat composition is usually from 40 to 90, more usually from 45 to 85, and still more usually from 50 to 70 weight percent calculated solids. The weight percent calculated solids is calculated as the percent of the silanol that theoretically forms during the hydrolysis of the orthosilicate.

Suitable silane monomers represented by general formula II include glycidoxymethyltriethoxysilane, glycidoxymethyltrimethoxysilane, alpha-glycidoxyethyltrimethoxysilane, alpha-glycidoxyethyltriethoxysilane, alpha-glycidoxypropyltrimethoxysilane, alpha-glycidoxypropyltriethoxysilane, alpha-glycidoxypropyltrimethoxysilane, alpha-glycidoxypropyltriethoxysilane, beta-glycidoxyethyltrimethoxysilane, beta-glycidoxyethyltriethoxysilane, beta-glycidoxypropyltrimethoxysilane, beta-glycidoxypropyltriethoxysilane, beta-glycidoxybutyltrimethoxysilane, beta-glycidoxybutyltriethoxysilane, gamma-glycidoxypropyltrimethoxysilane, gamma-glycidoxypropyltriethoxysilane, gamma-glycidoxypropyltripropoxysilane, gamma-glycidoxypropyltributoxysilane, gamma-glycidoxypropyltrimethoxysilane, gamma-glycidoxypropyltriphenoxysilane, gamma-glycidoxybutyltrimethoxysilane, gamma-glycidoxybutyltriethoxysilane, delta-glycidoxybutyltrimethoxysilane, delta-glycidoxybutyltriethoxysilane, hydrolyzates of such silane monomers, and mixtures of such silane monomers and hydrolyzates thereof.

The hard coat composition can further include from 5 to 65 weight percent, as calculated solids, of: (a) silane monomers represented by empirical formula III; (b) metal alkoxides represented by empirical formula IV; or (c) a mixture thereof in a weight ratio of (a):(b) of from 1:100 to 100:1. Typically, the hard coat composition includes from 10 to 60 weight percent calculated solids, more typically from 15 to 55, and still more typically from 30 to 50 weight percent calculated solids of the aforementioned materials (a), (b) or (c).

The hard coat composition can include at least one silane monomer represented by the following empirical formula III:

$$R^2{}_b(R^3)_c SiZ_{4-(b+c)} \quad\quad III$$

wherein $R^2$ may be $C_1$-$C_{20}$ alkyl, $C_1$-$C_{20}$ haloalkyl, $C_2$-$C_{20}$ alkenyl, $C_2$-$C_{20}$ haloalkenyl, phenyl, phenyl($C_1$-$C_{20}$)alkyl, $C_1$-$C_{20}$ alkylphenyl, phenyl($C_2$-$C_{20}$)alkenyl, $C_2$-$C_{20}$ alkenylphenyl, morpholino, amino($C_1$-$C_{20}$)alkyl, amino($C_2$-$C_{20}$)alkenyl, mercapto($C_1$-$C_{20}$)alkyl, mercapto($C_2$-$C_{20}$)alkenyl, cyano($C_1$-$C_{20}$)alkyl, cyano($C_2$-$C_{20}$)alkenyl, acryloxy, methacryloxy, or halogen. The halo or halogen may be bromo, chloro, or fluoro. Typically, $R^2$ is a $C_1$-$C_{10}$ alkyl, $C_1$-$C_{10}$ haloalkyl, $C_2$-$C_{10}$ alkenyl, phenyl, phenyl($C_1$-$C_{10}$)alkyl, $C_1$-$C_{10}$ alkylphenyl, morpholino, amino($C_1$-$C_{10}$) alkyl, amino($C_2$-$C_{10}$) alkenyl, mercapto($C_1$-$C_{10}$)alkyl, mercapto ($C_2$-$C_{10}$) alkenyl, cyano($C_1$-$C_{10}$) alkyl, cyano($C_2$-$C_{10}$)alkenyl, or halogen and the halo or halogen is chloro or fluoro.

In formula III, $R^3$ may be $C_1$-$C_{20}$ alkylene, $C_2$-$C_{20}$ alkenylene, phenylene, $C_1$-$C_{20}$ alkylenephenylene, amino($C_1$-$C_{20}$)alkylene, amino($C_2$-$C_{20}$)alkenylene; Z may be hydrogen, halogen, hydroxy, $C_1$-$C_5$ alkoxy, $C_1$-$C_5$ alkoxy($C_1$-$C_5$) alkoxy, $C_1$-$C_4$ acyloxy, phenoxy, $C_1$-$C_3$ alkylphenoxy, or $C_1$-$C_3$ alkoxyphenoxy, said halo or halogen being bromo, chloro or fluoro; b and c are each an integer of from 0 to 2; and the sum of b and c is an integer of from 0 to 3. Typically, $R^3$ is $C_1$-$C_{10}$ alkylene, $C_2$-$C_{10}$ alkenylene, phenylene, $C_1$-$C_{10}$ alkylenephenylene, amino($C_1$-$C_{10}$)alkylene, amino($C_2$-$C_{10}$) alkenylene, Z is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halo or halogen is chloro or fluoro.

Suitable silane monomers represented by general formula III include methyltrimethoxysilane, methyl-triethoxysilane, methyltrimethoxyethoxysilane, methyltri-acetoxysilane, methyltripropoxysilane, methyltributoxysilane, ethyltrimethoxysilane, ethyltriethoxysilane, gamma-methacryloxypropyl trimethoxysilane, gamma-aminopropyltrimethoxysilane, gamma-aminopropyltriethoxysilane, gamma-mercaptopropyltrimethoxysilane, chloromethyltrimethoxysilane, chloromethyltriethoxysilane, dimethyldiethoxysilane, gamma-chloropropylmethyldimethoxysilane, gamma-chloropropyl-methyldiethoxysilane, tetramethylorthosilicate, tetraethylorthosilicate, hydrolyzates of such silane monomers, and mixtures of such silane monomers and hydrolyzates thereof.

The hard coat composition can include at least one compound represented by empirical formula IV:

$$M(T)_q \quad\quad IV$$

wherein M is a metal selected from the group consisting of aluminum, antimony, tantalum, titanium and zirconium; T is $C_1$-$C_{10}$ alkoxy and q is an integer equivalent to the valence of M. Typically, M is selected from aluminum, titanium and zirconium and T is $C_1$-$C_5$ alkoxy, e.g., propoxy.

The hard coat composition can also include from 0 to 20 weight percent, based on the total weight of the composition, of a metal oxide selected from the group consisting of silica, i.e., silicon dioxide, aluminum oxide, antimony oxide, tin oxide, titanium oxide, zirconium oxide and mixtures thereof. The metal oxide may be in the form of a sol. As used in the present specification, by the term sol is meant a colloidal dispersion of finely divided solid inorganic metal oxide particles in an aqueous or an organic liquid. The average size of such particles may range from 1 to 200 nanometers, preferably from 2 to 100 nanometers, and more preferably, from 5 to 50 nanometers.

Such metal oxide sols can be prepared by hydrolyzing a metal salt precursor for a time sufficient to form the desired particle size or such sols may be purchased commercially. Examples of commercially available metal oxide sols that may be used in the hard coat composition include NALCO® colloidal sols (available from NALCO Chemical Co.), REMASOL® colloidal sols (available from Remet Corp.) and LUDOX® colloidal sols (available from E. I. du Pont de Nemours Co., Inc.). Stable acidic and alkaline metal oxide sols are commercially available as aqueous dispersions. Preferably, the metal oxide is silica or alumina supplied in the form of an acid stabilized colloidal silica, acid stabilized colloidal alumina, e.g., NALCO® 8676, or an acid stabilized alumina coated silica sol, e.g., NALCO® 1056. Metal oxide sols may also be obtained as dispersions in organic liquids, e.g., ethanol, isopropyl alcohol, ethylene glycol and 2 propoxyethanol.

The hard coat composition also contains a catalytic amount of a water-soluble acid catalyst. A catalytic amount is that amount which is sufficient to cause polycondensation of the silane monomer(s). Typically, the catalytic amount of acid catalyst will range from 0.01 to 10 weight percent, based on the total weight of the hard coat composition. The water-soluble acid catalyst may be an organic carboxylic acid or an inorganic acid. Examples of suitable catalysts include acetic acid, formic acid, glutaric acid, maleic acid, nitric acid, sulfuric acid and hydrochloric acid.

Organic solvents present in the hard coat composition may be added or formed in situ by the hydrolysis of the silane monomer(s). Suitable organic solvents are those that will dissolve or disperse the solid components of the coating composition. The minimum amount of solvent present in the coating composition is a solvating amount, i.e., an amount that is sufficient to solubilize or disperse the solid components in the coating composition. For example, the amount of solvent present may range from 20 to 90 weight percent based on the total weight of the coating composition and depends, in part, on the amount of silane monomer present in the coating composition. Suitable solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butyl-pyrrolidinone, N-ethylpyrrolidinone, N-(N-octyl)-pyrrolidinone, N-(n-dodecyl) pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold under the trade name CELLOSOLVE industrial solvents, propylene glycol methyl ether and propylene glycol methyl ether acetate, which are sold under the trade name DOWANOL® PM and PMA solvents, respectively, and mixtures of such solvents.

A leveling amount of nonionic surfactant(s) may be present as a component in the hard coat composition. A leveling amount is that amount which is sufficient to allow the coating to spread evenly or to level the hard coat composition on the surface of the AB film to which it is applied. Typically, the nonionic surfactant is a liquid at the conditions of use and is used in amounts from about 0.05 to about 1.0 weight percent based on the amount of the silane monomer(s). Suitable nonionic surfactants are described in the *Kirk Othmer Encyclopedia of Chemical Technology,* 3rd Edition, Volume 22, pages 360 to 377, the disclosure of which is incorporated herein by reference. Other potential nonionic surfactants include the surfactants described in U.S. Pat. No. 5,580,819, column 7, line 32 to column 8, line 46, which disclosure is incorporated herein by reference.

Examples of nonionic surfactants that may be used in the hard coat composition include ethoxylated alkyl phenols, such as the IGEPAL® DM surfactants or octyl-phenoxypolyethoxyethanol, which is sold as TRITON® X-100, an acetylenic diol such as 2,4,7,9-tetramethyl-5-decyne-4,7-diol, which is sold as SURFYNOL® 104, ethoxylated acetylenic diols, such as the SURFYNOL® 400 surfactant series, fluoro-surfactants, such as the FLUORAD® fluorochemical surfactant series, and capped nonionics, such as the benzyl capped octyl phenol ethoxylates, which is sold as TRITON® CF87, the propylene oxide capped alkyl ethoxylates, which are available as the PLURAFAC® RA series of surfactants, octylphenoxyhexadecylethoxy benzyl ether, polyether modified dimethylpolysiloxane copolymer in solvent, which is sold as BYK®-306 additive by Byk Chemie and mixtures of such recited surfactants.

Water is also present in the hard coat composition in an amount sufficient to form hydrolyzates of the silane monomer(s). This amount of water may be supplied by the water present in the optional metal oxide sol. If not, additional water may be added to the coating composition to provide the required additional amount necessary to hydrolyze the silane monomer(s).

The abrasion-resistant coating may be applied to the protective film using conventional film application techniques, e.g., spin coating, spray coating, spread coating, curtain coating, dip coating, casting or roll-coating. The abrasion resistant film may be applied in thickness of from 0.5 to 10 microns. Prior to applying the hard coat, e.g., the organo silane hard coat, to the AB film, the film may be treated to enhance its receptivity of and adhesion of the hard coat. Such treatments, e.g., plasma treatments, as are described above with respect to pretreatment of the photochromic coating prior to application of the AB film may be used.

In a further embodiment of the present invention, additional coatings, such as antireflective coatings, can be applied to the hard coat layer. Examples of antireflective coatings are described in U.S. Pat. No. 6,175,450 and International Patent Publication WO 00/33111, the disclosures of which are incorporated herein by reference.

An optical article of the present invention can be prepared in several ways. In one contemplated method, a laminate comprising a ply of the transparent thermoplastic polyurethane film and a ply of the protective film is placed on a surface of the selected optical substrate, and the laminate press formed against the substrate to adhere the laminate to the substrate. The laminate is of a sufficient size (area) to either cover completely the optical substrate, or only that portion of the substrate for which it is desired to impart the light filtering function.

If required and if appropriate, it is common to clean and/or treat the surface of the optical substrate to which the laminate is to be adhered by methods known to those skilled in the art. Such treatments are designed to improve the adhesion and/or compatibility of the substrate surface with the ply of the laminate bonded to it. Cleaning methods can include ultrasonic cleaning; washing with an aqueous mixture of organic solvent, e.g., a 50:50 mixture of isopropanol and water or ethanol and water. Surface treatments include, but are not limited to, activated gas treatments such as plasma discharge, corona discharge, glow discharge, ionizing radiation, UV radiation, and chemical treatment, e.g., hydroxylation by etching of the surface with an aqueous solution of caustic, e.g., sodium or potassium hydroxide, that may also contain a fluorosurfactant. See, for example, U.S. Pat. No. 3,971,872, column 3, lines 13-25; U.S. Pat. No. 4,904,525, column 6, lines 10 to 48; and U.S. Pat. No. 5,104,692, column 13, lines 10-59, which describe surface treatments of organic polymeric materials.

Methods used to clean glass substrates will depend on the type of dirt present on the glass surface, but are well known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. The glass surface may be chemically treated to enhance the adhesion of the thermoplastic polyurethane film (or other film) to the glass element, as is well known to those skilled in the art. Non-limiting examples of chemicals used for this purpose include monofunctional alkoxysilanes such as glycidoxypropyl trimethoxysilane, aminopropyl trimethoxysilane, 3,4-epoxycyclohexylethyl trimethoxysilane, and aminoethyl trimethoxysilane. As a variant to treating the glass surface, the monofunctional silane may be incorporated into the thermoplastic polyurethane film.

For purposes of convenience, the methods used to prepare an optical article of the present invention will be described in connection with an ophthalmic optical article, e.g., a lens. Thus, the laminate comprising the transparent thermoplastic polyurethane film (preferably containing at least one photochromic material) and the polymeric protective film is placed on the convex side of a pre-formed solid optical lens element having a convex side and a concave side (with or without pre-treatment to enhance adhesion). The polyurethane side of the laminate is positioned so that it is adjacent to the surface of the lens, e.g., against and in contact with the lens (or an adhesive placed on the surface of the lens). The laminate is then press formed against the surface of the substrate under conditions that conforms the laminate to the shape of the convex surface of the substrate. In cases where the curvature of the lens is large, e.g., greater than 4-base, the laminate is placed on the surface of the lens and then conformed to the shape of the lens before press forming the laminate against the surface of the substrate. Typically, a mold (glass or metal) having the same curvature as the convex surface of the lens is placed against the laminate before the press forming operation to assist in conforming the laminate to the curved surface of the optical substrate.

When used in connection with a described film, sheet or layer, the term "adjacent" or terms of like import, such as contiguous, next to, abutting, juxtaposed to, or appended to, are intended to have their ordinary and conventional meanings. The described film, sheet or layer can be positioned directly against the surface of the solid substrate or separated slightly from the surface of the substrate by, for example, a transparent adhesive film, transparent polyurethane adhesive film or other such compatible transparent, e.g., optically clear, film. In one embodiment, the described film, sheet or layer adheres directly to the surface of the solid substrate, but does not become thermally fused to the optical article; namely, the adhering described film, sheet or layer does not penetrate significantly the subsurface of the substrate so as to form an interpenetrating molecular network with the subsurface of the solid substrate. The described film, sheet or layer can be separated from the surface of the solid substrate by an adhesive film and/or other non-functional film (a film that does not provide any light filtering property), which adhesive or non-functional film is typically less than 20 mils (0.5 mm), usually less than 10 mils (0.25 mm), e.g., 5 mils (0.125 mm) or less, in thickness.

Conditions under which the laminate can be formed against the solid substrate include temperatures of from 250 to 350° F. (121 to 177° C.), e.g., 275 to 300° F. (135 to 149° C.), and pressures of from 150 to 400 pounds per square inch (psi) (1034 to 2758 kPa), e.g., 275 psi (1896 kPa). Sub-atmospheric pressures, i.e., a vacuum, can be applied to draw down and conform the laminate to the shape of the substrate. Sub-atmospheric pressures in the range of from 0.001 mm Hg to 20 mm Hg (0.13 Pa to 2.7 kPa) may be used. Either positive pressure (and heat) in the form of a rigid or flexible mold can be used alone, or sub-atmospheric pressure (and heat) can be used alone. In one embodiment, a combination of positive pressure and vacuum are used. For example, the combined substrate and laminate are placed in a suitable bag within an autoclave; sub-atmospheric pressure is applied to conform the laminate to the surface of the substrate on which the laminate is placed and to exclude air from between the laminate and the substrate. Thereafter, positive pressure in the form of a mold or platen in the shape of the substrate surface is then applied to the exposed surface of the laminate with simultaneous heating to force the substrate and laminate together, thereby forming an optical substrate and a superstrate having light filtering properties. A rigid or flexible mold may be used. Processing times for preparing the article can vary, but will generally be between 1 and 20 minutes.

If an adhesive is used to adhere the film, sheet or layer to the surface of the solid substrate, heat is generally not required to adhere the film, sheet or layer against the substrate surface unless the adhesive is a thermally cured adhesive. In that case, such heat as is required to cure the chosen adhesive would be required. UV cured adhesives also would not require additional heat. However, heat is required to thermoform the sheet, film, layer, e.g., a laminate, to the shape of the substrate.

Another contemplated method, e.g., the so-called film insert molding method, involves providing a laminate comprising a ply of the transparent thermoplastic polyurethane film and a ply of the protective film, i.e., a multi-plied laminate, and a mold having a first element, a second element and a cavity between such elements. In the case of an optical mold, the two sides of the mold comprise a convex element, a concave element and a peripheral gasket joining the mold elements. The laminate is placed within the mold so that the protective film is against the surface, e.g., the concave surface, of the mold element, i.e., the polyurethane ply faces the cavity, and polymerizable resin capable of forming a transparent plastic substrate is injected into the cavity of the optical mold. The resin is then cured within the mold, thereby forming a solid transparent plastic molded substrate having a first, e.g., concave, surface and a second, e.g., convex, surface with the laminate -attached to one surface, e.g., the convex surface, of the substrate as a superstrate. The laminate can be of a size that covers the entire working surface of the mold against which it is placed, or it can be of a size that covers only the portion of the surface of the mold for which it is desired to impart light filtering properties to the substrate. The laminate can be placed against one or both of the mold surfaces. In either case, the protective film is placed against the mold surface.

In both described methods, the laminate can comprise a single ply or be comprised of multiple plies, which plies provide one or more of the desired light filtering properties, e.g., (1) photochromism, (2) photochromism and tinting, (3) photochromism and light polarization, and (4) photochromism, light polarization, and tinting. Other combinations of the foregoing will be readily apparent to those skilled in the art.

The present invention is more particularly described in the following examples, which are intended as illustrative only, since numerous modifications and variations therein will be apparent to those skilled in the art. In the examples, percentages are reported as weight percent, unless otherwise specified.

EXAMPLE 1

A homogenous mixture of 62 grams of 4,4'-methylene-bis (cyclohexyl isocyanate) [DESMODUR W from Bayer Corporation], 2.65 grams of 1,4-butane diol [purchased from Aldrich] and 135 grams of polytetramethylene ether glycol [Terathane 1000, purchased from Aldrich] was prepared in a NALGENE® beaker and cured in an oven for 24 hours at 250° F. (121° C.). The resulting thermoplastic polyether-based polyurethane resin was removed from the beaker, pressed into a flat sheet with a hydraulic press and then cut into small pieces. The platens of the hydraulic press measured 24 inches×24 inches (61 cm×61 cm). 50 grams of the particulate polyurethane resin, and 0.50 grams of Irganox 1010 antioxidant [BASF Corporation] were mixed and placed into the mixing bowl of a Plasti-Corder mixer [C. W. Brabender Instruments, Inc.]. The mixture was blended at 98 rpm for 2 minutes at 150° C., which resulted in a molten homogenous mixture. To this molten mixture was added 0.27 grams of a mixture of naphtho[1,2-b]pyrans and indeno-fused naphtho [1,2-b]pyran photochromic dyes and the resultant mixture blended for an additional 2 minutes at 98 rpm and 150° C. to provide a homogenous mixture of photochromic resin. The mixture of photochromic dyes was designed to provide a gray color when the photochromic resin was activated with ultraviolet (UV) light. The molten mixture of photochromic resin was removed from the Plasti-Corder mixer and placed between two TEFLON sheets [purchased from McMaster Carr Supply Co., Cleveland, Ohio]. The TEFLON sheets were inserted into a hydraulic press that had been heated to 325° F. (163° C.), allowed to warm for 1 minute and then pressed to an applied pressure of 5 tons (17 psi, 120 kPa) for 1 minute. After the sheet cooled, a square section (approximately 3 to 5 grams) was cut from the sheet and placed between two 6 inch×6 inch (15.2×15.2 cm) glass plates [purchased from McMaster Carr Supply Co.] that were treated with RELISSE® mold release agent [nanoFILM LTD]. The glass plates were placed into the heated (163° C.) hydraulic press, allowed to warm for 1 minute and pressed to an applied pressure of 10 tons (34.7 psi, 239 kPa) for 1 minute, thereby to produce a smooth film. Aluminum shims [7 mil (0.175 mm)] were used to produce a uniformly thick film.

The 7 mil (0.175 mm) photochromic film was removed from between the glass plates and evaluated for photochromic performance. The initial percent transmission of the film, as measured by a Hunter spectrophotometer, was 86%. The film was exposed to a 360 nm UV lamp for 10 minutes, after which it was removed from under the lamp. The film was observed to change color, darkening to a percent transmission of 16% and bleaching to a percent transmission of 70% in 4 minutes.

The photochromic film was laminated to a 10 mil (0.25 mm) polycarbonate film (gloss/gloss finish grade) [purchased from McMaster Carr Supply Co.] using the hydraulic press (163° C., 239 kPa). The resulting laminate was placed onto the convex side of semi-finished, single vision 2-base polycarbonate lens [Gentex Optics, Inc.] and a glass mold matching the curvature of the lens surface was placed on top of the polycarbonate surface of the laminate. The resultant stack was placed in an autoclave for 15 minutes. Conditions in the autoclave were 280° F. (137.7° C.) and 275 pounds per square inch (psi) (1896 kPa). The stack was removed from the autoclave and the composite lens tested for photochromic performance. The % transmission of the lens when exposed to a 360 nm UV lamp for 10 minutes mirrored the photochromic performance of the polyurethane film before lamination to the polycarbonate film. When observed against a grid background, there was no observed optical distortion, i.e., distortion of the grid lines was not observed when looking through the composite lens.

EXAMPLE 2

The laminate of the photochromic polyether-based polyurethane film and polycarbonate film of Example 1 was placed on top of the convex surface of a 2-base polycarbonate lens [Gentex Optics, Inc.] and the lens/laminate combination placed onto a vacuum table operating at 280° F. (137.7° C.) and 0.1 mm mercury (13 Pa) for 20 minutes. The resulting composite lens was tested for optical distortion as in Example 1. No optical distortion was observed.

EXAMPLE 3

A homogenous mixture of 124.56 grams of 4,4'-methylene -bis(cyclohexyl isocyanate) [DESMODUR W from Bayer Corporation], 243.76 grams of poly (1,4-butylene adipate) polyol having a number average molecular weight of approximately 2000, and 31.72 grams of 1,4-butane diol was prepared in a beaker and cured in a conventional oven for 24 hours at 250° F. (121° C.). The resulting thermoplastic polyester-based polyurethane resin was removed from the beaker, pressed into a flat sheet with a hydraulic press and then cut into small pieces. To 50 grams of the particulate polyester-based polyurethane was added 1 weight percent of Irganox 1010 antioxidant and 0.5 weight percent of TINUVIN 144 hindered amine light stabilizer [Ciba-Geigy Corp.]. The mixture of resin and stabilizers were placed into the mixing bowl of a Plasti-Corder mixer and blended at 98 rpm for 2 minutes at 150° C., which resulted in a molten homogeneous mixture. To this molten mixture was added 0.27 grams of the photochromic dye mixture described in Example 1 and the resultant mixture blended for an additional 2 minutes at 98 rpm and 150° C. to provide a homogenous mixture of photochromic resin. The molten mixture of photochromic resin was removed from the Plasti-Corder mixer and processed in the same manner as described in Example 1 to produce a 7 mil (0.175 mm) thermoplastic polyester polyurethane film.

The polyester polyurethane film was tested for photochromic performance. The initial percent transmission of the film, as measured by a Hunter spectrophotometer, was 86%. The film was exposed to a 360 nm UV lamp for 10 minutes, after which it was removed from under the lamp. The film was observed to change color, darkening to a percent transmission of 15%, and bleaching to a percent transmission of 70% in 6 minutes.

EXAMPLE 4

A homogenous mixture of 62.38 grams of 4,4'-methylene-bis(cyclohexyl isocyanate) [DESMODUR W], 122.85 grams of hexane carbonate diol [PC 1122 from Stahl USA ] (number average molecular weight of 650) and 15.27 grams of 1,4-butane diol (Aldrich) was prepared in a NALGENE beaker and cured in an oven for 24 hours at 250° F. (121° C.). The resulting thermoplastic polycarbonate-based polyurethane was removed from the beaker, pressed into a flat sheet with a hydraulic press and then cut into small pieces, as described in Example 1. To 50 grams of the particulate polycarbonate-based polyurethane were added 1 weight percent of IRGANOX 1010 antioxidant and 0.5 weight percent of TINUVIN 144 hindered amine light stabilizer. The mixture of resin and stabilizers was placed into the mixing bowl of a Plasti-Corder mixer and blended at 98 rpm for 2 minutes at 150° C., which resulted in a homogenous mixture. To this molten mixture was added 0.27 grams of the photochromic dye mixture described in Example 1 and the resultant mixture blended for an additional 2 minutes at 98 rpm and 150° C. to provide a homogenous mixture of photochromic resin. The molten mixture of photochromic resin was removed from the Plasti-Corder mixer and processed in the same manner as described in Example 1 to produce a 7 mil (0.175 mm) thermoplastic polycarbonate polyurethane film.

The polycarbonate polyurethane film was tested for photochromic performance. The initial percent transmission of the film, as measured by a Hunter spectrophotometer, was 86%. The film was exposed to a 360 nm UV lamp for 10 minutes, after which it was removed from under the lamp. The film was observed to change color, darkening to a percent transmission of 17%, and fading to a percent transmission of 70% in 7 minutes.

EXAMPLE 5

A thermoplastic polyether-based polyurethane film of the type described in Example 1 was produced in the same manner described in Example 1 except that 1 weight percent of TINUVIN-144 hindered amine light stabilizer was added to the resin. This polyether-based polyurethane film, the polyester-based polyurethane film of Example 3 and the polycarbonate-based polyurethane film of Example 4 were tested in a Xenon weatherometer for 66 hours (1 hour at 40° C. and 45% relative humidity with no UV exposure; and 65 hours at 55° C., 70% relative humidity and 0.25 W/square meter of UV exposure).

The films were tested on an optical bench before and after weatherometer testing. The difference in Optical Density (Δ OD) was measured and recorded as % Fatigue of the photochromic film. The color values were also measured on a Hunter spectrophotometer before and after weatherometer testing. The delta b* and delta a* values reflect the changes in color of the photochromic film; namely, (+b) yellow, (−b) blue, (+a) red, and (−a) green. The percent fatigue and delta b* and delta a* values are reported in Table I.

TABLE I

| Film Material | Fatigue | Δb* | Δa* |
|---|---|---|---|
| Polyether Polyurethane | 7% | 1.6 | −0.4 |
| Polycarbonate Polyurethane | 5% | 1.5 | −1.4 |
| Polyester Polyurethane | 12% | 5.5 | 7.5 |

The values in Table I show that the polyester polyurethane film had a significantly increased fatigue rate (roughly 70%) and a significantly larger color shift upon fatigue towards the yellow-red compared to the polyether polyurethane and polycarbonate polyurethane films.

EXAMPLE 6

A photochromic polyether polyurethane/polycarbonate laminate of the type described in Example 1 was prepared. The laminate was applied to the front side of 2-base semi-finished, single vision LENSCO™glass lens [The Lens Co.] in the manner described in Example 1 to produce composite glass/laminate lenses. The lenses were ground to a 2.3 mm center thickness and tested by the standard FDA drop ball impact test. (21 CFR 801.410). A 16 gram ball dropped from a height of 50 inches (127 cm) shattered a standard (not laminated) glass lens; however, the composite lens of this Example passed this ball drop (16 gram) test, with no cracks across the lens and no material loss of glass from the backside. The composite lens cracked across the lens when a 24 gram ball was used, but no glass material was lost off of the backside.

EXAMPLE 7

The polycarbonate polyurethane/polycarbonate laminate of Example 2 was applied to the front surface of a 2-base semi-finished, high index, single vision Seiko MR-7 organic resin lens having a refractive index of 1.67 using the vacuum table and method described in Example 2. The lens was place under a 360 nm UV lamp to observe if any interference fringes resulted from the difference in refractive index between the lens and the laminate. (The refractive index of the polyurethane film was approximately 1.54, and the refractive index of the polycarbonate film was approximately 1.58.) No interference fringes for the composite lens were observed.

A 1.67 refractive index Seiko 2-base semi-finished, single vision lens was spin coated with a 25 micron photochromic polycarbonate-based polyurethane coating that had been prepared in a manner similar to that described in Example 2 of U.S. Pat. No. 6,187,444 B1, and similarly compared for interference fringes. A significant amount of interference fringes was observed for the photochromic polyurethane coated lens.

EXAMPLE 8

A 7 mil (0.175 mm) thermoplastic photochromic polyether-based polyurethane film was prepared in the manner described in Example 1 except that 0.27 grams of a blend of naphthopyrans different from that used in Example 1 was used. The blend of naphthopyrans was selected so as to produce an activated gray lens. The polyurethane film was laminated to a 10 mil (0.25 mm) polycarbonate film in the manner described in Example 1 to produce a laminate of the thermoplastic photochromic polyurethane film and the polycarbonate film (the "laminate"). The laminate was applied to the front side (concave) of a glass mold used to produce a semi-finished, single vision ophthalmic 0.5 base lens using a temporary adhesive (ReMount™ from 3M Company). The mold included convex (back side) and concave (front side) elements spaced apart by a peripheral gasket to provide a cavity of the size and shape of the desired lens.

A two-component liquid formulation for preparing a polyurea urethane; namely, a polyurethane prepolymer and diamine curing agent, available commercially from PPG Industries, Inc. as TRIVEX AH resin, was introduced into the cavity by means of a reaction injection molding machine (Max Machinery) in a ratio of 100 parts of prepolymer to 26.2 parts of diamine. The polyurethane prepolymer had a free NCO content of 13%. The diamine curing agent was Ethacure Curative 100 LC diamino diethyl toluene (Albermarle Corp.) Following the initial polymerization reaction, the mold (including the lens) was placed in a 130° C. oven for 5 hours to post cure the lens.

After cooling, the fabricated composite lens was removed from the mold and inspected. The laminate was observed to have very good adhesion to the lens. The initial (unactivated) transmission of the lens was 87%. The photochromic lens was activated by exposing it to a 360 nm UV lamp for 10 minutes. The activated transmission of the lens was 35%. It faded to 70% transmission in 50 seconds and completely faded to its original unactivated state in 2 minutes.

Although the present invention has been described with reference to specific details of certain embodiments thereof, it is not intended that such details should be regarded as limitations upon the scope of the invention except insofar as they are included in the accompanying claims.

What is claimed is:

1. A photochromic article consisting essentially of:
   (a) a transparent solid substrate having a front surface and a back surface, wherein said substrate is prepared from compositions selected from the group consisting of polymerizable allyl glycol carbonate monomer(s), thermoplastic polycarbonate, polyurea urethane, compositions comprising the reaction product of polyfunctional isocyanate(s) and polythiol monomer(s), compositions comprising the reaction product of polyfunctional isocyanate(s) and polyepisulfide monomer(s), optical quality mineral glass, and combinations thereof,
   (b) a transparent photochromic thermoplastic polyurethane film adjacent to at least one surface of said substrate, said polyurethane film having (i) a thickness of 2 to 15 mils, (ii) a flexural modulus of less than 2.5 GPa, and (iii) being formed from polyurethane material selected from the group consisting of polyether-based polyurethane, polycarbonate-based polyurethane and mixtures of such polyurethane materials, said polyurethane film containing at least one organic photochromic material that is soluble in the polyurethane film, and (c) transparent protective film of thermoplastic polymeric organic material superposed on said polyurethane film, said photochromic article exhibiting (1) a change in color when exposed to activating ultraviolet light radiation, and (2) a color fading half life (T½) of not more than 500 seconds when the ultraviolet light radiation is removed.

2. The article of claim 1 wherein the protective film of thermoplastic polymeric organic material is selected from nylon, poly(vinyl acetate), vinyl chloride-vinyl acetate copolymer, poly (lower alkyl) acrylates, poly (lower alkyl) methacrylates, styrene-butadiene copolymer resin, polyurea urethane, lightly cross-linked thermoplastic polyurethane and thermoplastic polycarbonate material.

3. The article of claim 1 wherein the protective film of polymeric material has a thickness of from 1 to 20 mils.

4. The article of claim 1 wherein an abrasion resistant coating is superposed on said protective film.

5. The article of claim 4 wherein the abrasion resistant coating is selected from polyfunctional acrylic hard coatings, melamine-based hard coatings, urethane-based hard coatings, alkyd-based hard coatings, silica sol-based hard coatings and organo-silane type hard coatings.

6. The article of claim 5 wherein the abrasion resistant coating comprises an organo-silane type abrasion resistant coating or a silica-sol-based hard coating.

7. The article of claim 4 wherein an anti-reflective coating is superposed on said abrasion resistant coating.

8. The article of claim 1 wherein a polarizing film pervious to ultraviolet light radiation is interposed between the photochromic thermoplastic polyurethane film and the protective film of thermoplastic polymeric organic material.

9. The article of claim 1 wherein the organic photochromic material is selected from benzoxazines, naphthoxazines, spiro(indolino)pyridobenzoxazines, benzopyrans, naphthopyrans, spiro-9-fluorenopyrans, phenanthropyrans, quinopyrans, indeno-fused naphthopyrans, fulgides, metal dithizonates, fulgimides and mixtures of such photochromic materials.

10. The article of claim 9 wherein the organic photochromic material comprises (a) at least one organic photochromic material having a visible lambda max of from 400 to less than 550 nanometers, and (b) at least one organic photochromic material having a visible lambda max of from 550 to 700 nanometers.

11. The article of claim 1 wherein a polarizing film impervious to ultraviolet light radiation is interposed between the transparent solid substrate and the photochromic thermoplastic polyurethane film.

12. The article of claim 1 wherein organic photochromic material is present in the polyurethane film in amounts of from 0.2 to 20 weight percent.

13. The article of claim 1 wherein the article is an optical article.

14. The article of claim 13 wherein the optical article is a lens having a refractive index of from 1.48 to 1.90.

15. The photochromic article of claim 2 wherein the article is an optical article and wherein organic photochromic material is present in the polyurethane film in amounts of from 0.2 to 10 weight percent.

16. The optical article of claim 15 wherein the article is a lens having a refractive index of from 1.48 to 1.75, and the polymeric protective film has a thickness of from 1 to 20 mils and a flexural modulus of from 0.1 to 5 GPa.

17. An ophthalmic photochromic article consisting essentially of:

(a) a transparent solid optical polymeric substrate having a front surface and a back surface, wherein the solid optical substrate is prepared from compositions selected from the group consisting of polyurea urethane, the reaction product of polyfunctional isocyanate(s) and polythiol monomer(s), the reaction product of polyfunctional isocyanate(s) and polyepisulfide monomer(s), and combinations thereof, (b) a transparent thermoplastic photochromic polyurethane film contiguous to one surface of said substrate, said polyurethane film having (i) a light transmission of at least 80%, (ii) a flexural modulus of less than 2.5 GPa, (iii) a thickness of from 2 to 15 mils, and (iv) being formed from polyurethane material comprising polyether-based polyurethane, polycarbonate-based-polyurethane or mixtures of such polyurethane materials, said polyurethane film further containing a photochromic amount of at least one organic photochromic material that is soluble in the polyurethane film, and (c) a transparent thermoplastic protective film of polymeric organic material superposed on said polyurethane film, said polymeric protective film having a light transmission of at least 80%, a thickness of from 1 to 20 mils and a flexural modulus of from 0.5 to 3 Gpa, said ophthalmic photochromic article exhibiting a change in color from colorless to colored when exposed to activating ultraviolet light radiation, and a color fading half-life (T½) of not more than 500 seconds when the ultraviolet light radiation is removed.

18. The ophthalmic article of claim 17 wherein the substrate is a lens having a refractive index of from 1.48 to 1.75.

19. The ophthalmic article of claim 18 wherein the lens is a plano lens, a single vision lens, a multi-focal lens, an aspheric lens, an aspheric multi-focal lens, or a semi-finished single vision lens.

20. The ophthalmic article of claim 17 wherein the organic photochromic material is chosen from benzoxazines, naphthoxazines, spiro(indolino)pyridobenzoxazines, benzopyrans, naphthopyrans, spiro-9-fluorenopyrans, phenanthropyrans, quinopyrans, indeno-fused naphthopyrans, fulgides, fulgimides, metal dithizonates, and mixtures of such photochromic materials.

21. The ophthalmic article of claim 20 wherein organic photochromic material is present in amounts of from 0.2 to 20 weight percent.

22. The ophthalmic article of claim 20 wherein the protective film comprises nylon, poly(vinyl acetate), vinyl chloride-vinyl acetate copolymer, poly (lower alkyl) acrylates, poly (lower alkyl) methacrylates, styrene-butadiene copolymer resin, polyurea urethanes, lightly cross-linked thermoplastic polyurethane and/or thermoplastic polycarbonate.

23. The ophthalmic article of claim 17 wherein an abrasion resistant coating is superposed on the protective polymeric film.

24. The ophthalmic article of claim 23 wherein the abrasion resistant coating comprises polyfunctional acrylic hard coatings, melamine-based hard coatings, urethane-based hard coatings, alkyd-based hard coatings, silica sol-based hard coatings and/or organo-silane type hard coatings.

25. The ophthalmic article of claim 17 wherein a polarizing film pervious to ultraviolet light radiation is interposed between the polyurethane film and the protective film of thermoplastic polymeric organic material.

26. The photochromic optical lens of claim 16 wherein:
(a) the lens substrate has a refractive index of from 1.50 to 1.67, said substrate having a convex surface and a concave surface, the lens substrate being prepared from compositions selected from the group consisting of polymerizable allyl glycol carbonate monomer(s), thermoplastic polycarbonates, substrates prepared from polyurea urethanes, and combinations thereof,
(b) the transparent thermoplastic photochromic polyurethane film is attached to the convex surface of the lens substrate, and
(c) the transparent thermoplastic protective film of polymeric organic material has a thickness of from 5 to 10 mils.

27. The photochromic lens of claim 26 wherein organic photochromic material is present in amounts of from 0.3 to 5 weight percent, the organic photochromic material comprises naphthoxazines, spiro(indolino)pyridobenzoxazines, naphthopyrans, spiro-9-fluorenopyrans, phenanthropyrans, indeno-fused naphthopyrans or mixtures of such photochromic materials, and the polymeric protective film is comprised of nylon, polyurea urethanes, lightly cross-linked thermoplastic polyurethane and/or thermoplastic polycarbonate material.

28. The photochromic lens of claim 27 wherein the lens substrate and the protective film each comprise thermoplastic polycarbonate material.

29. The photochromic lens of claim 27 wherein the protective film of polymeric material has a melting temperature of greater than 120° C., a light transmission value of greater than 80%, a flexural modulus of from 0.5 to 3 GPa, and an abrasion resistance that is greater than the polyurethane film.

30. The photochromic lens of claim 27 wherein an abrasion resistant coating is appended to the polymeric protective film and the abrasion resistant coating is selected from coatings comprising an organo-silane type hard coating and a silica sol-based hard coating.

31. The photochromic lens of claim 30 wherein an antireflective coating is appended to the abrasion resistant coating.

32. The optical article of claim 14 wherein the optical article is a high index photochromic lens wherein:
(a) the transparent solid optical polymeric substrate has a refractive index of at least 1.60, said substrate being prepared from compositions selected from the group consisting of polyurea urethane, the reaction product of polyfunctional isocyanate(s) and polythiol monomer(s), the reaction product of polyfunctional isocyanates and polyepisulfide monomer(s), and combinations thereof,
(b) the transparent thermoplastic photochromic polyurethane film is appended to at least one surface of said lens, and
(c) said optical lens being substantially free of interference fringes.

33. The lens of claim 32 wherein the polyurethane film contains from 0.3 to 5 weight percent of at least one organic photochromic material comprising naphthoxazines, spiro(indolino)pyridobenzoxazines, naphthopyrans, spiro-9-fluorenopyrans, phenanthropyrans, indeno-fused naphthopyrans or mixtures of such photochromic materials, and wherein the protective polymeric film has a thickness of from 5 to 10 mils and comprises nylon, polyurea urethanes, lightly cross-linked thermoplastic polyurethane or thermoplastic polycarbonate.

34. The lens of claim 33 wherein an abrasion resistant coating is appended to the protective polymeric film, and the abrasion resistant coating comprises organo-silane type abrasion resistant coatings and/or silica sol-based hard coatings.

35. The lens of claim 34 wherein an antireflective coating is appended to the abrasion resistant coating.

36. A photochromic optical article comprising, in combination:
(a) a transparent solid optical polyurea urethane substrate having a front surface and a back surface;
(b) transparent thermoplastic photochromic polyurethane film appended to at least one surface of the optical substrate, said polyurethane film having (i) a thickness of 2 to 15 mils, (ii) a flexural modulus of less than 2.5 GPa, and (iii) being formed from polyurethane material selected from polyether-based polyurethane materials, polycarbonate-based polyurethane materials and mixtures of said polyurethane materials, said polyurethane film further containing from 0.2 to 10 weight percent of at least one organic photochromic material that is soluble in the polyurethane film, said photochromic material being chosen from naphthoxazines, spiro(indolino) pyridobenzoxazines, naphthopyrans, spiro-9-fluorenopyrans, phenanthropyrans, indeno-fused naphthopyrans and mixtures of such photochromic materials; and
(c) transparent thermoplastic protective film of polymeric organic material superposed on said polyurethane film, said polymeric protective film having a flexural modulus of from 0.1 to 5 GPa, said polymeric protective film being selected from nylon, poly(vinyl acetate), vinyl chloride-vinyl acetate copolymer, poly(lower alkyl) acrylates, poly(lower alkyl)methacrylates, styrene-butadiene copolymer resin, polyurea urethane, lightly cross-linked thermoplastic polyurethane and thermoplastic polycarbonate material, said photochromic optical article exhibiting (1) a change in color when exposed to activating ultraviolet light radiation, and (2) a color fading half-life (T½) of not more than 500 seconds when the ultraviolet light radiation is removed.

37. The optical article of claim 36 wherein the polymeric protective film is thermoplastic polycarbonate.

* * * * *